(12) United States Patent
Malladi et al.

(10) Patent No.: US 12,475,305 B2
(45) Date of Patent: Nov. 18, 2025

(54) MACHINE LEARNING DIVIDE AND CONQUER TECHNIQUES FOR LONG DIALOG SUMMARIZATION

(71) Applicant: Optum, Inc., Minnetonka, MN (US)

(72) Inventors: Vijay Varma Malladi, Hyderabad (IN); Suman Roy, Bangalore (IN); Kaustav Mukherjee, Kolkata (IN)

(73) Assignee: Optum, Inc., Minnetonka, MN (US)

( * ) Notice: Subject to any disclaimer, the term of this patent is extended or adjusted under 35 U.S.C. 154(b) by 238 days.

(21) Appl. No.: 18/320,594

(22) Filed: May 19, 2023

(65) Prior Publication Data

US 2024/0386190 A1 Nov. 21, 2024

(51) Int. Cl.
*G06F 40/166* (2020.01)
*G06N 3/044* (2023.01)
*G06N 3/0455* (2023.01)

(52) U.S. Cl.
CPC ........... *G06F 40/166* (2020.01); *G06N 3/044* (2023.01); *G06N 3/0455* (2023.01)

(58) Field of Classification Search
None
See application file for complete search history.

(56) References Cited

U.S. PATENT DOCUMENTS

| | | | |
|---|---|---|---|
| 11,232,266 B1 | 1/2022 | Biswas et al. | |
| 11,314,790 B2 | 4/2022 | Chang et al. | |
| 12,164,550 B2 * | 12/2024 | Sotudeh Gharebagh | .................... G06F 16/345 |
| 2013/0081056 A1 * | 3/2013 | Hu | ........................... G06F 16/35 719/313 |
| 2021/0027772 A1 * | 1/2021 | Horev | .................... G06N 20/00 |
| 2021/0311973 A1 | 10/2021 | Radhakrishnan et al. | |
| 2022/0067269 A1 * | 3/2022 | de Oliveira | .............. G06N 3/04 |
| 2022/0108086 A1 | 4/2022 | Wu et al. | |
| 2022/0189484 A1 | 6/2022 | Malladi et al. | |
| 2022/0391591 A1 | 12/2022 | Ronen et al. | |
| 2023/0107640 A1 * | 4/2023 | Pang | ..................... G06F 40/166 715/254 |

(Continued)

OTHER PUBLICATIONS

Beltagy, Iz et al. "Longformer: The Long-Document Transformer," arXiv preprint arXiv:2004.05150v2 [cs.CL], Dec. 2, 2020, (17 pages), available online: https://arxiv.org/pdf/2004.05150.pdf?forcedefault=true.

(Continued)

*Primary Examiner* — Nafiz E Hoque
(74) *Attorney, Agent, or Firm* — Alston & Bird LLP

(57) ABSTRACT

Various embodiments of the present disclosure provide summarization techniques for summarizing complex documents, such as long unstructured call transcripts. The summarization techniques include generating a plurality of interaction topics for an interaction transcript and iteratively summarizing each interaction topic based on a preceding partial summary for the interaction transcript that corresponds to a preceding interaction topic that precedes the interaction topic in the interaction transcript. An abstractive summary is generated using a recursive abstractive model that is trained using training data generated based on holistic similarity scores between interaction topics of a call transcript and summary sentences of a corresponding target summary.

20 Claims, 9 Drawing Sheets

(56) References Cited

U.S. PATENT DOCUMENTS

2023/0259544 A1     8/2023    Sotudeh et al.
2023/0419042 A1*   12/2023   Sabapathy ............. G06N 20/00

OTHER PUBLICATIONS

Bunt, Harry "Context and Dialogue Control," Think Quarterly, vol. 3, No. 1, May 1994, pp. 19-31, available online: https://www.researchgate.net/profile/Harry-Bunt/publication/2506880_Context_and_Dialogue_Control/links/545cce6a0cf27487b44d06b9/Context-and-Dialogue-Control.pdf.

Garg, Nikhil et al. "Cluster Rank: A Graph Based Method For Meeting Summarization," Idiap Research Institute, INTERSPEECH 2009, 10th Annual Conference of the International Speech Communication Association, Brighton, United Kingdom, Jun. 2009, pp. 1499-1502, DOI:10.21437/Interspeech.2009-456.

Gidiotis, Alexios et al. "A Divide-and-Conquer Approach to the Summarization of Long Documents," IEEE/ACM Transactions on Audio, Speech, and Language Processing, vol. 28, Nov. 12, 2020, pp. 3029-3040, DOI:10.1109/TASLP.2020.3037401.

Hearst, Marti A. "TextTiling: Segmenting Text Into Multi-Paragraph Subtopic Passages," Computational Linguistics, vol. 23, Issue 1, Mar. 1, 1997, pp. 33-64, DOI: 10.5555/972684.972687.

Koay, Jia Jin et al. A Sliding-Window Approach To Automatic Creation Of Meeting Minutes. arXiv preprint arXiv:2104.12324 [cs.CL], Apr. 26, 2021, (8 pages), available online: https://arxiv.org/pdf/2104.12324.pdf.

Libovický, Jindrich et al. "Input Combination Strategies For Multi-Source Transformer Decoder," arXiv Preprint arXiv:1811.04716v1 [cs.CL], Nov. 12, 2018, (8 pages), DOI:10.18653/v1/W18-6326.

Lin, Chin-Yew. "Rouge: A Package for Automatic Evaluation Of Summaries," Proceedings of the Workshop On Text Summarization Branches Out, Jul. 2004, pp. 74-81, Barcelona, Spain. Association for Computational Linguistics.

Liu, Yixin et al. " BRIO: Bringing Order to Abstractive Summarization," Proceedings of the 60th Annual Meeting of the Association For Computational Linguistics, vol. 1: Long Papers, May 22-27, 2022, pp. 2890-2903, DOI: 10.18653/v1/2022.acl-long.207, Dublin, Ireland, Association for Computational Linguistics.

Mihalcea, Rada et al. "TextRank: Bringing Order Into Text," Proceedings of the 2004 Conference On Empirical Methods In Natural Language Processing, pp. 404-411, Jul. 2004, Barcelona, Spain, Association For Computational Linguistics, available online: https://aclanthology.org/W04-3252.

Murray, Gabriel et al. "Generating and Validating Abstracts of Meeting Conversations: A User Study," In Proceedings of the 6th International Natural Language Generation Conference, Jul. 2010, (9 pages), available online: https://aclanthology.org/W10-4211, Association for Computational Linguistics.

Pilault, Jonathan et al. "On Extractive and Abstractive Neural Document Summarization with Transformer Language Models," Proceedings of the 2020 Conference On Empirical Methods In Natural Language Processing (EMNLP), Nov. 16-20, 2020, pp. 9308-9319, DOI: 10.18653/v1/2020.emnlp-main.748.

Rennard, Virgile et al. "Abstractive Meeting Summarization: A Survey," arXiv preprint arXiv:2208.04163v1 [cs.CL], Aug. 9, 2022, (20 pages), available online: https://arxiv.org/pdf/2208.04163v1.pdf.

Solbiati, Alessandro et al. "Unsupervised Topic Segmentation of Meetings With BERT Embeddings," arXiv Preprint arXiv:2106.12978v1 [cs.LG], Jun. 24, 2021, (7 pages), available online: https://arxiv.org/pdf/2106.12978.pdf.

Szegedy, Christian et al. "Rethinking The Inception Architecture For Computer Vision," In Proceedings of the IEEE Conference On Computer Vision and Pattern Recognition (CVPR), (Year: 2016), pp. 2818-2826, available online: https://www.cv-foundation.org/openaccess/content_cvpr_2016/papers/Szegedy_Rethinking_the_Inception_CVPR_2016_paper.pdf.

Vaswani, Ashish et al. "Attention Is All You Need," 31st Conference On Neural Information Processing Systems (NIPS 2017), Advances In Neural Information Systems, vol. 30, (Year: 2017), (11 pages), available online: https://proceedings.neurips.cc/paper/2017/file/3f5ee243547dee91fbd053c1c4a845aa-Paper.pdf.

Williams, Ronald J. et al. "Gradient-Based Learning Algorithms For Recurrent Networks and Their Computational Complexity," Back-Propagation: Theory, Architectures and Applications, vol. 13, Jan. 1, 1995, pp. 433-486.

Zhang, Yusen et al. "An Exploratory Study on Long Dialogue Summarization: What Works and What's Next," Findings of the Association For Computational Linguistics: EMNLP 2021, Nov. 2021, pp. 4426-4433, DOI: 10.18653/v1/2021.findings-emnlp.377, Punta Cana, Dominican Republic, Association for Computational Linguistics.

Zhang, Yusen et al. "SummN: A Multi-Stage Summarization Framework for Long Input Dialogues and Documents," arXiv preprint arXiv:2110.10150v2 [cs.CL], Apr. 13, 2022, (13 pages), available online: https://arxiv.org/pdf/2110.10150.pdf.

Zhong, Ming et al. ":DialogLM: Pre-Trained Model For Long Dialogue Understanding and Summarization," In Proceedings of the AAAI Conference on Artificial Intelligence, vol. 36, No. 10, Jun. 28, 2022 pp. 11765-11773.

Non-Final Rejection Mailed on Jun. 17, 2025 for U.S. Appl. No. 18/320,588, 9 page(s).

* cited by examiner

MACHINE LEARNING DIVIDE AND CONQUER TECHNIQUES FOR LONG DIALOG SUMMARIZATION

BACKGROUND

Various embodiments of the present disclosure address technical challenges related to abstractive summarization techniques given limitations of existing natural language and machine learning approaches. Existing abstractive summarization techniques are unable to summarize long, unstructured, dialogs, such as call transcripts. In the event summaries are generated, such summaries include disjointed sentences that are not grounded in the context of the dialog as a whole. These summaries are inaccurate, disjointed, and often emphasize irrelevant portions of a dialog. Various embodiments of the present disclosure make important contributions to various existing natural language and machine learning approaches by addressing each of these technical challenges.

BRIEF SUMMARY

Various embodiments of the present disclosure disclose divide and conquer summarization techniques for improved long dialog summarization. Conventional summarization techniques generate long dialog summaries by individually summarizing portions of the long dialog which results in summaries consisting of disjointed sentences uninfluenced by the overall context of the dialog. The present disclosure provides divide and conquer techniques that leverage a machine learning recursive abstractive model to generate summaries of long form dialogs that are grounded in the overall context of the dialog. The machine learning recursive abstractive model is trained, using training techniques of the present disclosure, to provide an abstractive summary of a long form dialog in which each preceding sentence of the abstractive summary is considered when generating the next sentence of the summary. In this way, using the techniques of the present disclosure, a machine learning model may be trained and then leveraged to generate summaries of long form dialogs that improve upon the accuracy, coherence, and relevance of conventional long summarization techniques.

In some embodiments, a computer-implemented method comprises generating, by one or more processors, a plurality of interaction topics for an interaction transcript, wherein each interaction topic comprises one or more respective related sequential utterances of the interaction transcript; receiving, by the one or more processors, a preceding partial summary for the interaction transcript, wherein the preceding partial summary corresponds to at least one preceding interaction topic that precedes an interaction topic in the interaction transcript; and generating, by the one or more processors and using a machine learning recursive abstractive model, an abstractive summary for the interaction transcript based on the interaction topic and the preceding partial summary.

In some embodiments, a computing apparatus comprises a memory and one or more processors communicatively coupled to the memory. The one or more processors are configured to generate a plurality of interaction topics for an interaction transcript, wherein each interaction topic comprises one or more respective related sequential utterances of the interaction transcript; receive a preceding partial summary for the interaction transcript, wherein the preceding partial summary corresponds to at least one preceding interaction topic that precedes an interaction topic in the interaction transcript; and generate, using a machine learning recursive abstractive model, an abstractive summary for the interaction transcript based on the interaction topic and the preceding partial summary.

In some embodiments, one or more non-transitory computer-readable storage media include instructions that, when executed by one or more processors, cause the one or more processors to: generate a plurality of interaction topics for an interaction transcript, wherein each interaction topic comprises one or more respective related sequential utterances of the interaction transcript; receive a preceding partial summary for the interaction transcript, wherein the preceding partial summary corresponds to at least one preceding interaction topic that precedes an interaction topic in the interaction transcript; and generate, using a machine learning recursive abstractive model, an abstractive summary for the interaction transcript based on the interaction topic and the preceding partial summary.

In some embodiments, a computer-implemented method comprises generating, by one or more processors, a plurality of interaction topics for an interaction transcript, wherein each interaction topic comprises one or more respective related sequential utterances of the interaction transcript; generating, by the one or more processors, a holistic similarity score between a particular interaction topic and a target summary sentence of a target summary corresponding to the interaction transcript; identifying, by the one or more processors, a preceding summary sentence that precedes the target summary sentence in the target summary; generating, by the one or more processors and using a machine learning recursive abstractive model, a training summary sentence for the particular interaction topic based on one or more related sequential utterances of the particular interaction topic and the preceding summary sentence; and updating, by the one or more processors, the machine learning recursive abstractive model based on a comparison between the training summary sentence and the target summary sentence.

In some embodiments, a computing apparatus comprises a memory and one or more processors communicatively coupled to the memory. The one or more processors are configured to: generate a plurality of interaction topics for an interaction transcript, wherein each interaction topic comprises one or more respective related sequential utterances of the interaction transcript; generate a holistic similarity score between a particular interaction topic and a target summary sentence of a target summary corresponding to the interaction transcript; identify a preceding summary sentence that precedes the target summary sentence in the target summary; generate, using a machine learning recursive abstractive model, a training summary sentence for the particular interaction topic based on one or more related sequential utterances of the particular interaction topic and the preceding summary sentence; and update the machine learning recursive abstractive model based on a comparison between the training summary sentence and the target summary sentence.

In some embodiments, one or more non-transitory computer-readable storage media include instructions that, when executed by one or more processors, cause the one or more processors to: generate a plurality of interaction topics for an interaction transcript, wherein each interaction topic comprises one or more related sequential utterances of the interaction transcript; generate a holistic similarity score between a particular interaction topic and a target summary sentence of a target summary corresponding to the interaction transcript; identify a preceding summary sentence that precedes the target summary sentence in the target summary;

generate, using a machine learning recursive abstractive model, a training summary sentence for the particular interaction topic based on one or more related sequential utterances of the particular interaction topic and the preceding summary sentence; and update the machine learning recursive abstractive model based on a comparison between the training summary sentence and the target summary sentence.

DETAILED DESCRIPTION

Figure 1:
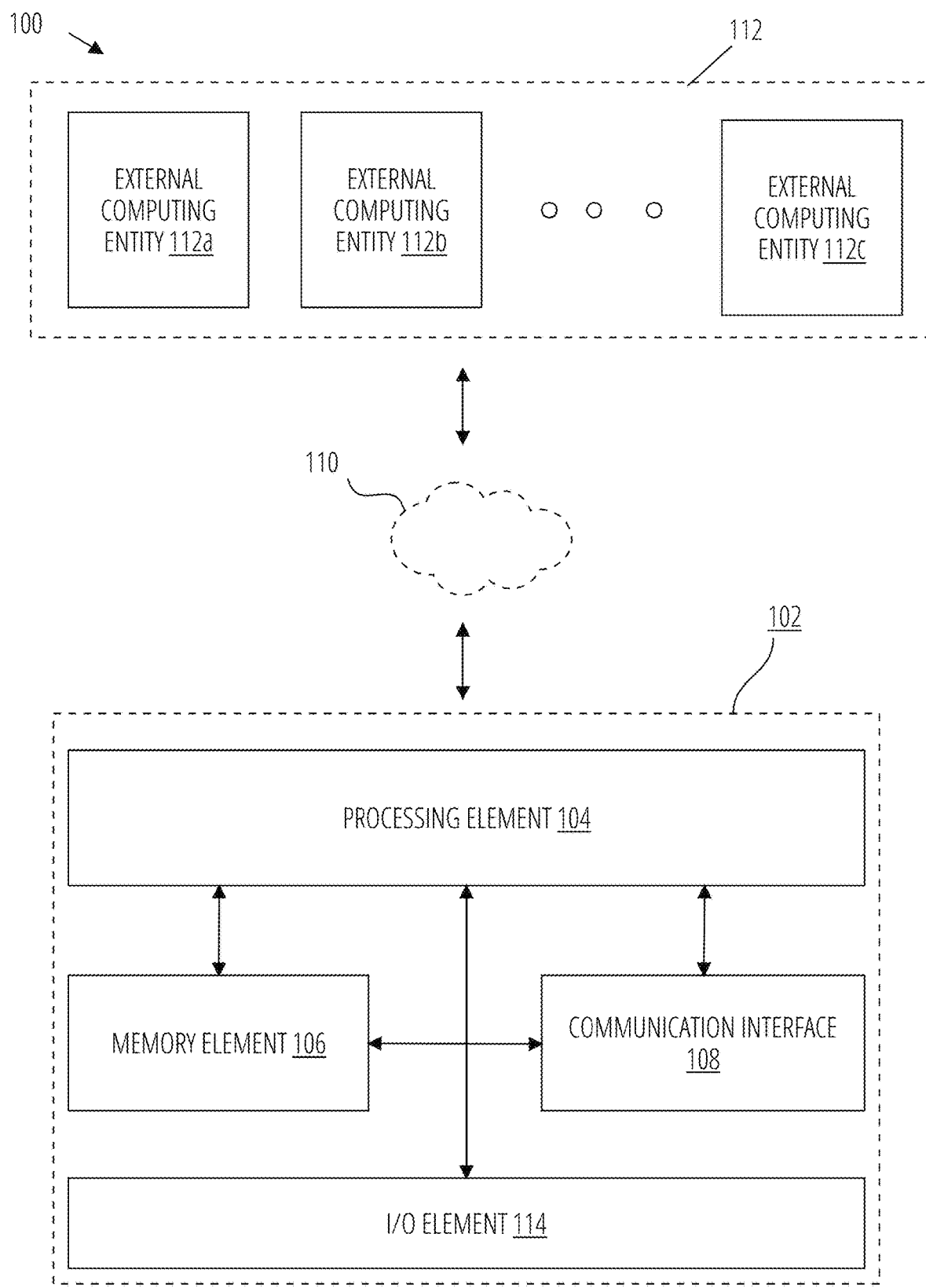
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., divide and conquer techniques, training techniques, data generation techniques, and/or the like) described herein.

The external computing entities 112a-c, for example, may include and/or be associated with one or more data centers, call centers, and/or any other external entity that may be configured to receive, store, and/or interpret long, unstructured, dialogs, such as interaction transcripts. The data centers, for example, may be associated with one or more data repositories storing transcript data, training data, targeted summary data, and/or the like that can, in some circumstances, be processed by the predictive computing entity 102 to generate an abstractive summary and/or train a machine learning model. In some embodiments, one or more of the external computing entities 112a-c may include one or more data processing entities that may receive, store, and/or have access to training data for machine learning models. The data processing entities, for example, may maintain a training datastore with a plurality of targeted summaries, training pairs, and/or the like.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
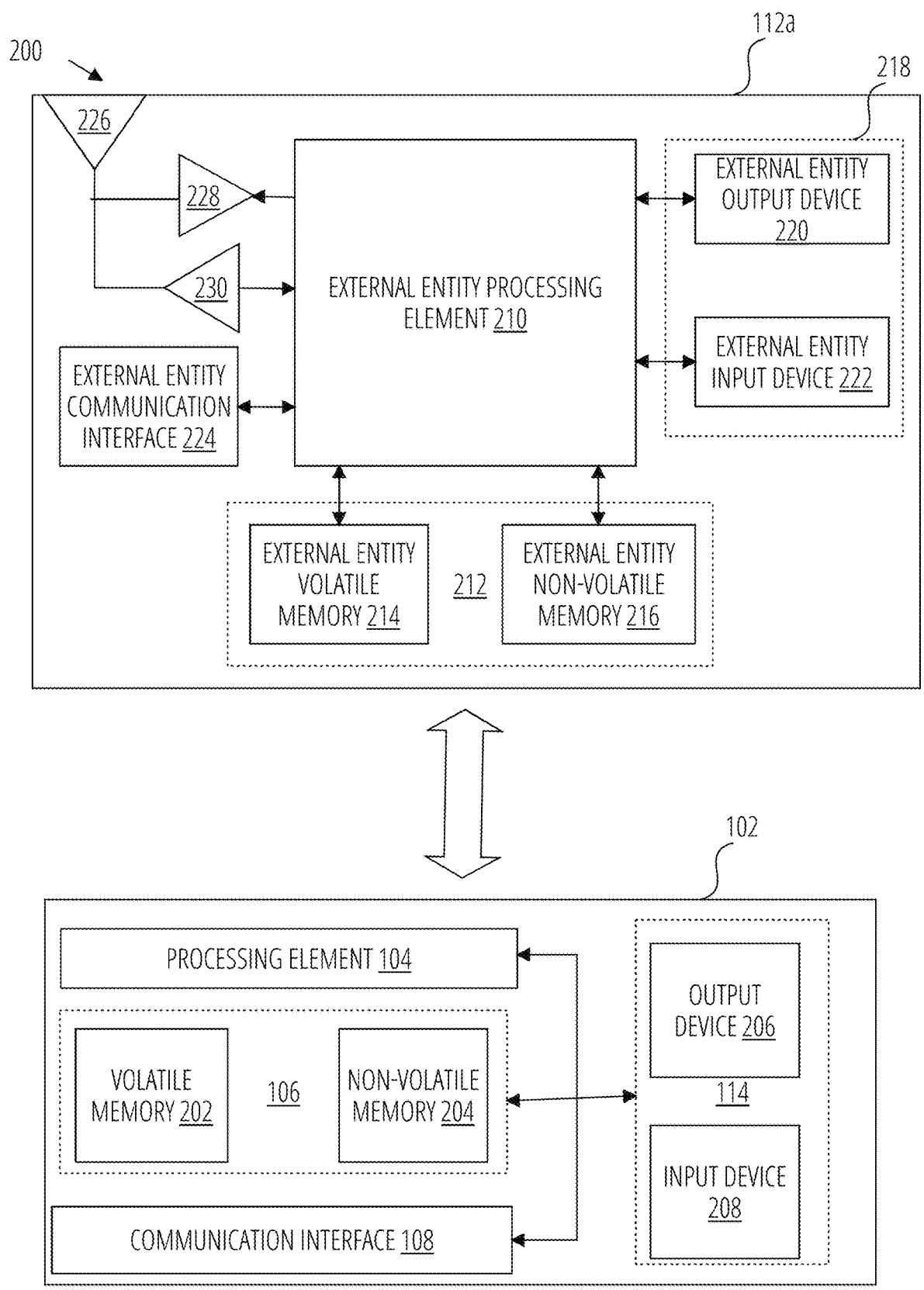
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "interaction transcript" refers to a data entity that is configured to describe a temporal flow of verbal interactions between one or more interaction participants. The interaction transcript may include a plurality of interaction utterances, each descriptive of a verbal interaction between the one or more interaction participants. As an example, an interaction transcript may include a call transcript between one or more participants of a call. The call transcript may describe verbal interactions by the participants of the call in a temporally sequential manner, where each verbal interaction by a participant may include one or more interaction utterances (e.g., each including one or more sentences). For example, a call transcript may describe that a first utterance by a first participant (e.g., "Hello, how is your day today. How may I help you?") is temporally followed by a second utterance by another participant (e.g., "Thank you. I'm doing well. I am trying to check my account balance."), which may then be temporally followed by a third utterance by the first participant, and so on. Other examples of interaction transcripts may include meeting transcripts, conference call transcripts, auction transcripts, chat-bot transcripts, and/or the like.

In some embodiments, the term "interaction utterance" refers to a data entity that is configured to describe a semantically coherent unit of words that is recorded by the interaction transcript. An example of an interaction utterance is one or more sequential sentences attributed to one of the one or more interaction participants. In some embodiments, one or more speech fragmentation algorithms, such as one or more sentence detection algorithms, may be configured to detect the plurality of interaction utterances in an interaction transcript. Each interaction utterance in an interaction transcript may be associated with (i) an interaction participant of the one or more interaction participants, (ii) a timing/duration such as one or more timestamps and/or the like, and/or (iii) a placement of the interaction utterance within the interaction transcript.

In some embodiments, the term "interaction transcript" refers to a data entity that is configured to describe a temporal flow of verbal interactions between one or more interaction participants. An interaction transcript may include a plurality of interaction utterances, each descriptive of a verbal interaction between the one or more interaction participants. An example of an interaction transcript is a call transcript between one or more participants of a call, such as a call transcript for a call between a customer service agent and a customer. In the noted example, the call transcript may describe verbal interactions by the participants in a temporally sequential manner, where each verbal interaction by a participant may include one or more utterances (e.g., each including one or more sentences). For example, with respect to the call transcript for a call between a customer service agent and a customer, the call transcript may describe that a first utterance by the customer service agent (e.g., "Hello, how is your day today. How may I help you?") is temporally followed by a second utterance by the customer (e.g., "Thank you. I'm doing well. I am trying to check my account balance."), which may then be temporally followed by a third utterance by the customer service agent, and so on. Other examples of interaction transcripts include meeting transcripts, conference call transcripts, auction transcripts, chat-bot transcripts, and/or the like.

In some embodiments, the term "interaction utterance" refers to a data entity that is configured to describe a semantically coherent unit of words that is recorded by the interaction transcript. An example of an interaction utterance is one or more sequential sentences attributed to one of the one or more interaction participants. In some embodiments, one or more speech fragmentation algorithms such as one or more sentence detection algorithms may be configured to detect the plurality of interaction utterances in an interaction transcript. Each interaction utterance in an interaction transcript may be associated with (i) an interaction participant of the one or more interaction participants, (ii) a timing/duration such as one or more timestamp and/or the like, and/or (iii) a placement of the interaction utterance within the interaction transcript.

In some embodiments, the term "interaction topic" refers to a data entity that is configured to describe one or more of a plurality of interaction utterances of an interaction transcript. An interaction topic may include a segment, or a collection of utterances, of the interaction transcript that is related to a topic of the interaction transcript. The collection of utterances may include one or more related sequential utterances from the interaction transcript. Each interaction utterance of the one or more related sequential utterances may be associated with a sequential timing and/or sequential placement within the interaction transcript.

In some embodiments, the term "topic segmentation model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A topic segmentation model may include a topic segmentation algorithm trained and/or otherwise configured to generate a plurality of interaction topics for an interaction transcript. The topic segmentation algorithm may include one or more of any type of machine learning model including one or more supervised, unsupervised, semi-supervised, and/or reinforcement learning models. In some embodiments, the topic segmentation algorithm may include multiple models configured to perform one or more different stages of a topic segmentation process. As one example, a topic segmentation model may include a machine learning model trained, using one or more unsupervised training techniques, to generate a plurality of interaction topics for an interaction transcript. The topic segmentation model, for example, may include an unsupervised topic segmentation model. The unsupervised topic segmentation model may be configured to generate an utterance similarity score between each pair of interaction utterances from the plurality of interaction utterances of an interaction transcript. The unsupervised topic segmentation model may generate the plurality of interaction topics by assigning one or more topic labels to each of the pair of interaction utterances based on the utterance similarity score. As one example, in the event that the utterance similarity score is below a threshold, the unsupervised topic segmentation model may assign a first topic label to a first interaction utterance of the pair of interaction utterances and a second, different, topic label to a second interaction utterance of the pair of interaction utterances to generate two interaction topics for the interaction transcript.

The unsupervised topic segmentation model may include a TextTiling algorithm that detects topic changes using an utterance similarity score that is based on word frequencies. In addition, or alternatively, the unsupervised topic segmentation model may include a modified version of the TextTiling algorithm in which topic changes are detected using a similarity score based on Bidirectional Encoder Representations from Transformers ("BERT") embeddings. As an example, the unsupervised topic segmentation model may be configured to: (i) generate a BERT embedding for each interaction utterance, $u_i$, of an interaction transcript, $C$; (ii) divide the interaction transcript, $C$, into blocks of utterances $\{B_1, B_2, \ldots, B_k\}$, and perform a block-wise max pooling operation to extract the embedding $R_i$ for each block; (iii) generate a cosine similarity, $Sim_i$, between adjacent blocks $R_i$ and $R_{i+1}$, in which $Sim_i$ may represent the semantic similarity between two blocks separated at utterance $\mu_i$; and (iv) generate the plurality of interaction topics by deriving one or more topic boundaries as pairs of blocks $R_i$ and $R_{i+1}$ with semantic similarity $Sim_i$ lower than a threshold utterance similarity. In some embodiments, the unsupervised topic segmentation model generates a sequence of topic changes $T=\{i \in [0, M] | Sim_i < \mu_s - \sigma_s\}$ where $\mu_s$ and $\sigma_s$ are the mean and variance of the sequence of block similarities $Sim_i$. In such a case, the plurality of interaction topics may be generated by applying the sequence of topic changes to the interaction transcript, $C$. In this way, the machine learning topic segmentation model may be leveraged to divide an interaction transcript into a plurality of interaction topics, each of which may include a separate portion (e.g., one or more interaction utterances) of the interaction transcript.

In some embodiments, the term "topic relevance" refers to a parameter for an interaction topic that describes a relevance of the interaction topic relative to a desired summary for the interaction transcript. The topic relevance for a particular interaction topic may indicate whether the particular interaction topic is a relevant topic or an irrelevant topic with respect to a desired summary for the interaction transcript. The topic relevance may be a binary parameter descriptive of a relevant topic or an irrelevant topic. In addition, or alternatively, the topic relevance may be a magnitude (e.g., proportional, degree, and/or the like)

descriptive of a degree of relevance for an interaction topic. In such a case, the topic relevance may indicate that an interaction topic is a relevant topic in the event that it achieves a relevance threshold.

In some examples, the topic relevance may include a topic similarity score descriptive of a similarity between one or more of the related sequential utterances of an interaction topic and one or more summary sentences of an extractive summary for the interaction transcript. For example, a topic similarity score may be generated (e.g., based on a textual similarity, and/or the like) for each of the related sequential utterances of an interaction topic. Each topic similarity score may describe a similarity between a respective interaction utterance and a respective extractive summary sentence. In some embodiments, a topic similarity score is generated for each pair of interaction utterances and extractive summary sentence and the highest similarity score is selected for each interaction utterance. The topic relevance of an interaction topic may be based on the topic similarity score for each interaction utterance of the interaction topic. As examples, the topic relevance may include and/or be based on the highest topic similarity score across each of the related sequential utterances, an aggregate topic similarity score, and/or the like.

In some embodiments, the term "extractive summary" refers to one or more summary sentences for an interaction transcript that are generated using extractive summarization techniques. An extractive summary may describe one or more interaction utterances of an interaction transcript that representative of the interaction transcript as a whole.

In some embodiments, the term "extractive summarizer model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). An extractive summarizer model may include a machine learning model. The extractive summarizer model may include one or more of any type of machine learning model including one or more supervised, unsupervised, semi-supervised, and/or reinforcement learning models. In some embodiments, the extractive summarizer model may include an unsupervised machine learning model, such as Text Rank induced graph-based summarization model, an unsupervised summarization of meeting extending Text Rank algorithm, and ontology-based unsupervised extraction of summary for meetings, and/or the like. In some embodiments, the extractive summarizer model is configured to receive an interaction transcript as input, process the interaction transcript, and generate an extractive summary for the interaction transcript.

In some embodiments, the term "abstractive summary" refers to one or more summary sentences for an interaction transcript that are generated using an abstractive summarization model. An abstractive summary for an interaction transcript is distinct from an extractive summary in that it is not tied to the exact language of the interaction transcript. An extractive summary, for instance, may include a concatenation of important utterances from an interaction transcript without an understanding of the meaning of the important utterances, whereas an abstractive summary may include a meaningful summary based on the important utterances from the interaction transcript. An abstractive summary may include a plurality of summary sentences that summarize the important aspects of an interaction transcript. The plurality of summary sentences may include new sentences that are generated by rephrasing and/or augmenting interaction utterances from the interaction transcript with new words. In some embodiments, an abstractive summary is generated for an interaction transcript using a machine learning recursive abstractive model.

In some embodiments, the term "machine learning recursive abstractive model" refers to a data entity that describes parameters, hyper-parameters, and/or defined operations of a machine learning model (e.g., model including at least one of one or more rule-based layers, one or more layers that depend on trained parameters, coefficients, and/or the like). A machine learning recursive abstractive model may include a divide and conquer model configured to generate an abstractive summary from an interaction transcript. The machine learning recursive abstractive model may include one or more of any type of machine learning model including one or more supervised, unsupervised, semi-supervised, and/or reinforcement learning models.

In some embodiments, the machine learning recursive abstractive model may include multiple models configured to perform one or more different stages of an iterative abstractive summarization process.

In some embodiments, the machine learning recursive abstractive model is a recursive summarization model that includes a neural network architecture. The machine learning recursive abstractive model may include a double encoder network with a first encoder (e.g., a first encoding layer), a second encoder (e.g., second encoding layer), and attention layer, and/or a decoder among other layers.

The machine learning recursive abstractive model may generate the abstractive summary over one or more iterations of a divide and conquer technique. At each interaction, the machine learning recursive abstractive model may generate a partial abstractive summary for an interaction topic of the interaction transcript. Each partial abstractive summary, generated after the first iteration, may be generated based on a summary sentence (e.g., a preceding summary sentence) and/or a partial abstractive summary (e.g., a preceding partial summary) generated during one or more preceding iterations of the divide and conquer technique. For example, a preceding abstractive summary, generated during one or more iterations preceding a current iteration of the divide and conquer technique, may be passed to the machine learning recursive abstractive model as a second input to be considered as contextual information for the input interaction topic.

In some embodiments, at a respective iteration, the first encoder of the machine learning recursive abstractive model is configured to generate a first encoding based on a respective interaction topic. In some embodiments, the second encoder is configured to generate a second encoding based on a preceding partial summary (and/or one or more summary sentences thereof). For instance, the preceding partial summary may be passed to the machine learning recursive abstractive model as input using the second encoder. The machine learning recursive abstractive model may include an attention layer configured to generate an attended encoding based on the first encoding and the second encoding and a decoder configured to generate the abstractive summary based on the attended encoding. For instance, the decoder may attend the preceding partial summary hidden states as it attends the first encoding. In some embodiments, the recursive summarization techniques of the present disclosure are model agnostic and are applicable to any encoder-decoder, such as a DialogLM Model among others.

In some embodiments, the attended encoding includes an aggregations of two embeddings, a first and second embedding, generated from two transformer sources, a first and second encoder, used for encoding the interaction utterances and a preceding summary sentence of a preceding partial summary. In some embodiments, the attended encoding may be generated by combining the attention from these two transformer sources. Attention layer, for example, may include a soft-lookup function operating on an associative memory. For each query Q, the attention layer computes a set of weighted sums of values V associated with a set of keys K, based on their similarity to the query. The variant of the attention function may be called a multi-head scaled dot-product attention.

The machine learning recursive abstractive model may include a plurality of layers. Each layer may be divided in three sub-layers: self-attention, encoder-decoder (or cross) attention, and a feed-forward layer. Both of the attention types use identical sets for keys and values. The states of the previous layer are used as the query sets. The self-attention sub-layer attends to the previous decoder layer (e.g., the sets of queries and keys are identical). The decoder may work autoregressively from left to right during training such that the self-attention is masked to prevent attending to the future positions in the sequence. The encoder-decoder attention sub-layer attends to the final layer of the encoder. The feed-forward sub-layer consists of a single non-linear projection (usually to a space with larger dimension), followed by a linear projection back to the vector space with the original dimension. The input of each sub-layer is summed with the output, creating a residual connection chain throughout the whole layer stack.

The machine learning recursive abstractive model may include a serial combination of transformers, which model the encoder-decoder attention independently and extend the sub-layer scheme in the transformer decoder. In the serial strategy, the machine learning recursive abstractive model determines the encoder-decoder attention one-by-one for each input encoder. The query set of the first cross-attention is the set of the context vectors computed by the self-attention. The query set of each subsequent cross-attention is the output of the preceding sub-layer. All of these sub-layers may be interconnected with residual connections.

By including a preceding partial summary when generating an abstractive summary for an interaction topic, the machine learning recursive abstractive model may generate more appropriate summaries considering the context provided by the preceding summaries. This enables the machine learning recursive abstractive model to generate context aware abstractive summaries that improve upon the accuracy and readability of summaries provided by conventional divide and conquer techniques.

In some embodiments, the term "preceding partial summary" refers to a partial abstractive summary for an interaction transcript that summarizes a portion of the interaction utterances of the interaction transcript. For example, the preceding partial summary may include one or more preceding summary sentences corresponding to one or more preceding interaction topics that precede an interaction topic being processed at a current iteration of a divide and conquer abstraction summarization technique. For instance, the interaction topic may include a first subset of the plurality of interaction utterances of an interaction transcript. The preceding partial summary may include one or more preceding summary sentences corresponding to a second subset of the plurality of interaction utterances that precede the first subset in the interaction transcript.

In some embodiments, the term "target summary" refers to a ground truth abstractive summary for an interaction transcript. The target summary may be descriptive of a desired abstractive summary for an interaction transcript. The target summary may include a plurality of target summary sentences that are descriptive of one or more important aspects of the interaction transcript. A respective target summary may be manually generated and/or automatically generated using one or more abstractive summarization techniques.

In some embodiments, the term "holistic similarity score" refers to a parameter that describes a similarity between an interaction topic of an interaction transcript and a target summary sentence of the target summary. The holistic similarity score may be based on a semantic similarity measure and/or a syntactic similarity measure between the one or more related sequential utterances and the target summary sentence. For example, the holistic similarity score may include a convex combination of the semantic similarity measure and/or a syntactic similarity measure.

In some embodiments, the term "semantic similarity measure" refers to a metric that describes a measure of similarity between one or more interaction utterances and a target sentence. A semantic similarity measure may be generated using one or more different semantic similarity models including, as examples, one or more text transformers, and/or the like. A semantic similarity measure between a target sentence, $s_i$, and one or more interaction utterances of an interaction topic, $\theta_j$, may be generated based on a cosine similarity between a respective embedded representation (e.g., using a test transformer, and/or the like) for the target sentence, $s_i$, and the interaction topic, $\theta_j$.

In some embodiments, the term "syntactic similarity measure" refers to a metric that describes a measure of similarity between one or more interaction utterances and a target summary sentence. A syntactic similarity measure may be generated using one or more different syntactic evaluation algorithms including, as examples, a Rouge score, and/or the like. A syntactic similarity measure between a target summary sentence, $s_i$, and one or more interaction utterances of an interaction topic, $\theta_j$, may be generated based on a Rouge score between the target summary sentence, $s_i$, and the interaction topic, $\theta_j$.

In some embodiments, the term "training pair" refers to an associated target summary sentence and interaction topic. A training pair may include a target summary sentence and an interaction topic that achieve a similarity threshold. The similarity threshold may be indicative of a highest similarity value for the interaction topic. For example, the target summary sentence, $s_i$, may be associated with the interaction topic, Ok, to form a training pair in the event that the target summary sentence, $s_i$, is associated with the highest holistic similarity score relative to a plurality of holistic similarity scores generated between interaction topic $\theta_j$ and each target summary sentence of the target summary such that $k = \mathrm{argmax}_{\{1 \leq j \leq M\}} \mathrm{Sim}(s_i, \theta_j)$.

In some embodiments, the term "loss function" refers to a machine learning training algorithm for evaluating and optimizing the performance of a machine learning model, such as the machine learning recursive abstractive model. The loss function may include any machine learning loss function including, as examples, binary cross-entropy loss, hinge loss, mean square error, mean absolute error, Huber loss, Log-Cosh loss, quantile loss, and/or the like. In some embodiments, the loss function is a log likelihood function configured to generate a model loss including a negative log likelihood loss. For instance, the recursive abstractive model may be trained by updating one or more parameters of the recursive abstractive model to minimize the model loss.

For example, during training, each respective topic segment of an interaction transcript and a preceding summary sentence in the target summary may be used as a training input and an associated target summary sentence corresponding to the respective topic segment may be used as a ground truth. The machine learning recursive abstractive model may be trained in a teacher forcing manner in which the model loss is minimized, for example, by minimizing a negative log likelihood target summary sequence, $S=(s_1, s_2, \ldots, SN)$, given the training input topic segments, $\theta_1, \theta_2, \ldots, \theta_L$ for the ith target summary sentence, $s_i$, with respect to the associated topic segment, $\theta_j$, and the preceding summary sentence in the target summary $s_{i-1}$ in the chronological order. In some embodiments, the target summary sentence $s_i$ may be represented as a sequence of tokens, $s_i = w_1^i, w_2^i, \ldots, w_{l_i}^i$, where $l_i$ is the length of the target summary sentence $s_i$ (e.g., the number of tokens appearing in it). In such case the loss function, which is to be minimized may include:

$$loss_t = -\sum_{\{i=1\}}^{N} \sum_{\{w_k^i \in s_i\}} p_{(true)}(w_k^i \mid w_k^i \in scope(s_{i-1}), \theta_j, w_{\{<k\}}^i, \Phi) \times$$

$$\log p_{(summ)}(w_k^i \mid \theta_j, s_{i-1}, w_{\{<k\}}^i, \Phi)$$

In some embodiments, $w_k^i \in scope(s_{i-1})$ if $w_k^i$ appears in a sentence following the sentence $s_{i-1}$ appearing in the target summary. In addition, or alternatively, $w_{\{<k\}}^i$ may denote an output sequence of tokens of length less than k and $\Phi$ is the set of estimation parameters of the transformer.

IV. Overview, Technical Improvements, and Technical Advantages

Embodiments of the present disclosure present machine learning, training, and data generation techniques that improve computer interpretation and summarization of long, unstructured, dialogs. To do so, the present disclosure provides iterative divide and conquer techniques that leverage a recursive abstractive model to iteratively generate partial abstractive summaries for sections of the long, unstructured, dialog without losing the overall context provided by the dialog as a whole. The present disclosure provides training techniques for training the recursive abstractive model to generate a partial abstractive summary for a segment of the dialog based on both the words of the segment and a previously generated partial summary corresponding to segments of the dialog that chronologically precede the segment. The present disclosure provides data generation techniques for automatically generating training data for implementing such training techniques. In this way, the present disclosure provides an improved machine learning model and methods for implementing a divide and conquer summarization of a long, unstructured, dialog that improve upon conventional abstractive summarization techniques.

The iterative divide and conquer techniques may be applied to call transcripts as well as any other unstructured or structured document of any length or complexity. The complexity of a respective document may be effectively reduced by decomposing the problem of long document summarization into smaller summarization problems. To do so without losing the overall context of the original document, the iterative divide and conquer techniques leverage a new machine learning model architecture that includes two encoders and an attention layer between the encoders and a decoder. The attention layer is configured to attend hidden states from a previous abstractive summary to features extracted for a current segment of a document. In this way, the machine learning model architecture facilitates the generation of new abstractive summaries that are grounded in the context provided by previous abstractive summaries for the document. This enables the generation of abstractive summaries for complex documents that include continuous, connected, sentences with improved accuracy, coherence, and relevance relative to conventional abstractive summaries.

The training techniques may be leveraged to train the new machine learning model architecture to accurately and efficiently summarize sections of a document while accounting for the overall context of the document. To do so, the training techniques break training documents and a target summaries into multiple, smaller, source-target pairs. The model may be trained to summarize these smaller document sections using the document section and a partial summary for a segment of the document preceding the document section such that the partial summary preceding the document section may influence summaries output by the model. The model may be trained to aggregate partial summaries for each section of the document to provide a final complete summary. The data generation techniques may leverage new text similarity metrics such a holistic similarity score to automatically generate source-target pairs (e.g., training pairs) to increase the number and the quality of the training examples. Each source-target pair may be focused on a specific aspect of a document, which results in better alignment, less noise, and leads to a decomposition of the summarization problem into simpler summarization problems that are easier to learn.

Example inventive and technologically advantageous embodiments of the present disclosure include: (i) divide and conquer techniques for generating abstractive summaries of long, unstructured, documents; (ii) techniques for reducing summarization complexity by decomposing the problem of long document summarization into smaller summarization problems without losing the overall context of the long document as a whole; (iii) data generation techniques for automatically generating training pairs specifically tailored for training machine learning models configured to implement divide and conquer summarization techniques; and (iv) model architectures and training techniques for generating a recursive abstractive model configured to implement divide and conquer summarization techniques.

V. Example System Operations

As indicated, various embodiments of the present disclosure make important technical contributions to abstractive summarization techniques. In particular, systems and methods are disclosed herein that implement iterative divide and conquer techniques configured to divide a dialog, such as an interaction transcript, into a plurality of segments, such as interaction topics, and iteratively summarize each segment based on the words of the segment and the context provided by an abstractive summary preceding the segment. In this way, the abstractive summarization techniques improve upon existing summarization techniques by generating abstractive summaries for complex documents without losing the overall context from the document. The iterative divide and conquer techniques are facilitated by a recursive abstractive model that includes a new model architecture and is training according to training techniques specifically tailored to improve the performance of the recursive abstractive model relative to conventional abstractive summarization models. Moreover, the training techniques leverage training data generated through automatic data generation techniques to improve the quality of training examples available for training the recursive abstractive model as well as any other abstractive summarization model.

Figure 3:
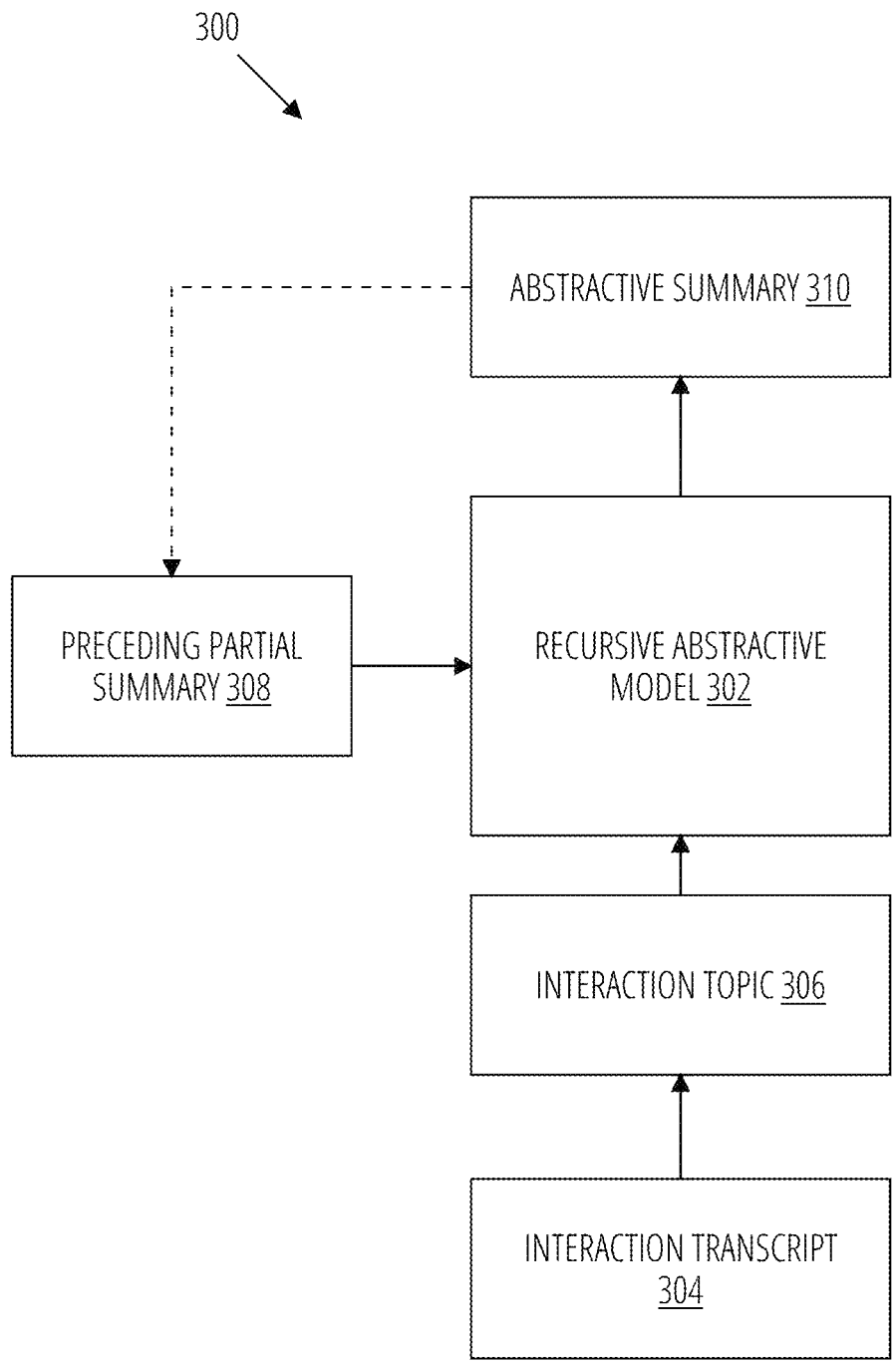
FIG. 3 is a dataflow diagram showing example data structures for generating an abstractive summary in accordance with some embodiments discussed herein.

FIG. 3 is a dataflow diagram 300 showing example data structures for generating an abstractive summary in accordance with some embodiments discussed herein. The dataflow diagram 300 depicts a set of data structures and algorithms for facilitating iterative divide and conquer techniques for summarizing a dialog. The dataflow diagram 300 shows one iteration of the iterative divide and conquer techniques in which an abstractive summary 310 is generated for an interaction transcript 304. The iterative divide and conquer techniques may include a plurality of iterations. At each iteration, the abstractive summary 310 may be revised and regenerated based on a portion of the interaction transcript 304 until each relevant portion of the interaction transcript 304 is considered by the recursive abstractive model 302.

In some embodiments, the interaction transcript 304 describes a temporal flow of verbal interactions between one or more interaction participants. The interaction transcript 304 may include a plurality of interaction utterances, each descriptive of a verbal interaction between the one or more interaction participants. As an example, an interaction transcript 304 may include a call transcript between one or more participants of a call. The call transcript may describe verbal interactions by the participants of the call in a temporally sequential manner, where each verbal interaction by a participant may include one or more interaction utterances (e.g., each including one or more sentences). For example, a call transcript may describe that a first utterance by a first participant (e.g., "Hello, how is your day today. How may I help you?") is temporally followed by a second utterance by another participant (e.g., "Thank you. I'm doing well. I am trying to check my account balance."), which may then be temporally followed by a third utterance by the first participant, and so on. Other examples of interaction transcripts 304 may include meeting transcripts, conference call transcripts, auction transcripts, chat-bot transcripts, and/or the like.

In some embodiments, an interaction utterance of the interaction transcript 304 describes a semantically coherent unit of words that is recorded by the interaction transcript 304. An example of an interaction utterance is one or more sequential sentences attributed to one of the one or more interaction participants. In some embodiments, one or more speech fragmentation algorithms, such as one or more sentence detection algorithms, may be configured to detect the plurality of interaction utterances in the interaction transcript 304. Each interaction utterance in the interaction transcript 304 may be associated with (i) an interaction participant of the one or more interaction participants, (ii) a timing/duration such as one or more timestamps and/or the like, and/or (iii) a placement of the interaction utterance within the interaction transcript 304.

In some embodiments, a computing system, such as the computing system 100, generates the abstractive summary 310 for the interaction transcript 304 by summarizing the plurality of interaction utterances. The interaction transcript 304 may include a long form dialog with prohibitively long sequences of interaction utterances that pose challenges to traditional abstractive summarization approaches. For instance, long sequences of interaction utterances may exceed input limits imposed by transformer-based pretrained models to limit the complexity and needed processing resources for generating an abstractive summary.

Meanwhile, the interactive nature of the interaction transcript 304 makes relevant information more context-dependent and sparsely distributed than long form documents which prevents the use of traditional divide and conquer approaches designed to accommodate input limits imposed by such models. In some embodiments, the iterative divide and conquer techniques of the present disclosure are leveraged to overcome these limitations.

In some embodiments, the divide and conquer techniques include dividing the interaction transcript 304, and/or the plurality of interaction utterances thereof, into a plurality of interaction topics including, as one example, the interaction topic 306. For example, the computing system 100 may generate a plurality of interaction topics for the interaction transcript 304. Each interaction topic may include one or more related sequential utterances of the interaction transcript 304.

In some embodiments, the interaction topic 306 includes a data entity that is configured to describe one or more of a plurality of interaction utterances of the interaction transcript 304. The interaction topic 306 may include a segment, or a collection of utterances, of the interaction transcript 304 that is related to a topic of the interaction transcript 304. The collection of utterances may include one or more related sequential utterances from the interaction transcript 304. Each interaction utterance of the one or more related sequential utterances may be associated with a sequential timing and/or sequential placement within the interaction transcript 304.

In some embodiments, the plurality of interaction topics for the interaction transcript 304 is generated using a machine learning topic segmentation model. A topic segmentation model may include a data entity that describes parameters, hyper-parameters, and/or defined operations of a rules-based and/or machine learning model (e.g., model including at least one of one or more rule-based layers, one or more layers that depend on trained parameters, coefficients, and/or the like). The topic segmentation model may include a topic segmentation algorithm trained and/or otherwise configured to generate a plurality of interaction topics for the interaction transcript 304. The topic segmentation algorithm may include one or more of any type of machine learning model including one or more supervised, unsupervised, semi-supervised, and/or reinforcement learning models. In some embodiments, the topic segmentation algorithm may include multiple models configured to perform one or more different stages of a topic segmentation process.

As one example, a topic segmentation model may include a machine learning model trained, using one or more unsupervised training techniques, to generate a plurality of interaction topics for the interaction transcript 304. The topic segmentation model, for example, may include an unsupervised topic segmentation model. The unsupervised topic segmentation model may be configured to generate an utterance similarity score between each pair of interaction utterances from the plurality of interaction utterances of the interaction transcript 304. The unsupervised topic segmentation model may generate the plurality of interaction topics by assigning one or more topic labels to each of the pair of interaction utterances based on the utterance similarity score. As one example, in the event that the utterance similarity score is below a threshold, the unsupervised topic segmentation model may assign a first topic label to a first interaction utterance of the pair of interaction utterances and a second, different, topic label to a second interaction utterance of the pair of interaction utterances to generate two interaction topics for the interaction transcript 304.

As an example, the unsupervised topic segmentation model may include a TextTiling algorithm that detects topic changes using an utterance similarity score that is based on word frequencies. In addition, or alternatively, the unsupervised topic segmentation model may include a modified version of the TextTiling algorithm in which topic changes are detected using a similarity score based on BERT embeddings. As an example, the unsupervised topic segmentation model may be configured to: (i) generate a BERT embedding for each interaction utterance, $u_i$, of an interaction transcript, C; (ii) divide the interaction transcript, C, into blocks of utterances $\{B_1, B_2, \ldots, B_k\}$, and perform a block-wise max pooling operation to extract the embedding $R_i$ for each block; (iii) generate a cosine similarity, $Sim_i$, between adjacent blocks $R_i$ and $R_{i+1}$, in which $Sim_i$ may represent the semantic similarity between two blocks separated at utterance $u_i$; and (iv) generate the plurality of interaction topics by deriving one or more topic boundaries as pairs of blocks $R_i$ and $R_{i+1}$ with semantic similarity $Sim_i$ lower than a threshold utterance similarity. In some embodiments, the unsupervised topic segmentation model generates a sequence of topic changes $T=\{i \in [0, M] | Sim_i < \mu_s - \sigma_s\}$ where $\mu_s$ and $\sigma_s$ are the mean and variance of the sequence of block similarities $Sim_i$. In such a case, the plurality of interaction topics may be generated by applying the sequence of topic changes to the interaction transcript, C. In this way, the machine learning topic segmentation model may be leveraged to divide an interaction transcript into a plurality of interaction topics, each of which may include a separate portion (e.g., one or more interaction utterances) of the interaction transcript.

In some embodiments, the computing system 100 generates, using the machine learning topic segmentation model, an utterance similarity score between a pair of interaction utterances from the plurality of interaction utterances. The computing system 100 may assign a first topic label to a first interaction utterance of the pair of interaction utterances based on the utterance similarity score and assign a second topic label to a second interaction utterance of the pair of interaction utterances based on the utterance similarity score.

In some embodiments, the divide and conquer techniques include generating the abstractive summary 310 for the interaction transcript 304 based on the interaction topic 306. For example, the computing system 100 may provide the interaction topic 306 as an input to the recursive abstractive model 302 to generate the abstractive summary 310.

In some embodiments, the computing system 100 provides the interaction topic 306 as an input to the recursive abstractive model 302 in response to a determination that the interaction topic 306 is a relevant interaction topic from the interaction transcript 304. For example, the computing system 100 may determine a topic relevance for the interaction topic 306 based on the one or more related sequential utterances of the interaction topic 306. The topic relevance may be indicative of at least one of a relevant topic or an irrelevant topic.

In some embodiments, the topic relevance refers to a parameter for the interaction topic 306 that describes a relevance of the interaction topic 306 relative to a desired summary for the interaction transcript 304. The topic relevance for the interaction topic 306 may indicate whether the interaction topic 306 is a relevant topic or an irrelevant topic with respect to a desired summary for the interaction transcript 304. The topic relevance may be a binary parameter descriptive of a relevant topic (e.g., a 1) or an irrelevant topic (e.g., a 0). In addition, or alternatively, the topic relevance may be a magnitude (e.g., proportional, degree, and/or the like) descriptive of a degree of relevance for the interaction topic 306. In such a case, the topic relevance may indicate that an interaction topic 306 is a relevant topic in the event that it achieves a relevance threshold.

In some embodiments, a topic relevance is determined for each of the plurality of interaction topics generated for the interaction transcript 304 based on an extractive summary for the interaction transcript 304. An extractive summary may include one or more summary sentences for the interaction transcript 304 that are generated using extractive summarization techniques. The extractive summary may describe one or more interaction utterances of the interaction transcript 304 that are representation of the interaction transcript 304 as a whole.

In some examples, the topic relevance for the interaction topic 306 may include a topic similarity score descriptive of a similarity between one or more of the related sequential utterances of the interaction topic 306 and one or more summary sentences of an extractive summary for the interaction transcript 304. For example, a topic similarity score may be generated (e.g., based on a textual similarity, and/or the like) for each of the related sequential utterances of an interaction topic 306. Each topic similarity score may describe a similarity between a respective interaction utterance and a respective extractive summary sentence. In some embodiments, a topic similarity score is generated for each pair of interaction utterances and extractive summary sentences and the highest similarity score is selected for each interaction utterance. The topic relevance of an interaction topic 306 may be based on the topic similarity score for one or more of the interaction utterances of the interaction topic 306. As examples, the topic relevance may include and/or be based on the highest topic similarity score across each of the related sequential utterances, an aggregate topic similarity score, and/or the like.

In some embodiments, the computing system 100 generates the extractive summary for the interaction transcript 304 using a machine learning extractive summarizer model. The extractive summarizer model may include a data entity that describes parameters, hyper-parameters, and/or defined operations of a rules-based and/or machine learning model (e.g., model including at least one of one or more rule-based layers, one or more layers that depend on trained parameters, coefficients, and/or the like). The extractive summarizer model may include a machine learning model. For example, the extractive summarizer model may include one or more of any type of machine learning model including one or more supervised, unsupervised, semi-supervised, and/or reinforcement learning models. In some embodiments, the extractive summarizer model may include an unsupervised machine learning model, such as a Text Rank induced graph-based summarization model, an unsupervised summarization of meeting extending a Text Rank algorithm, an ontology-based unsupervised extraction of summary for meetings, and/or the like. In some embodiments, the extractive summarizer model is configured to receive an interaction transcript 304 as input, process the interaction transcript 304, and generate an extractive summary for the interaction transcript 304.

In some embodiments, the computing system 100 generates a topic similarity score between the one or more related sequential utterances of the interaction topic 306 and the extractive summary. The topic similarity score may be indicative of a textual similarity between at least one of the one or more related sequential utterances and at least one extractive sentence from the extractive summary. The computing system 100 may determine the topic relevance of the interaction topic 306 based on the topic similarity score. In response to determining that the interaction topic 306 is the relevant topic, the computing system 100 may generate, using the machine learning recursive abstractive model 302, the abstractive summary 310 for the interaction transcript 304 based on the interaction topic 306.

In some embodiments, the abstractive summary 310 includes one or more summary sentences for the interaction transcript 304 that are generated using the recursive abstractive model 302. The abstractive summary 310 for the interaction transcript 304 may be distinct from the extractive summary in that it is not tied to the exact language of the interaction transcript 304. An extractive summary, for instance, may include a concatenation of important interaction utterances from the interaction transcript 304 without an understanding of the meaning of the important utterances, whereas the abstractive summary 310 may include a meaningful summary based on the important utterances from the interaction transcript 304. The abstractive summary 310 may include a plurality of summary sentences that summarize the important aspects of the interaction transcript 304. The plurality of summary sentences may include new sentences that are generated by rephrasing and/or augmenting interaction utterances from the interaction transcript 304 with new words. In some embodiments, the abstractive summary 310 is generated for the interaction transcript 304 using the recursive abstractive model 302.

In some embodiments, the recursive abstractive model 302 includes a machine learning model previously trained to iteratively generate the abstractive summary 310 for the interaction transcript 304. At a respective iteration, the recursive abstractive model 302 may be configured to process the interaction topic 306 with a preceding partial summary 308 generated for the interaction transcript 304 in a preceding iteration to generate an abstractive summary 310 that considers contextual information from the preceding segments of the interaction transcript 304. The recursive abstractive model 302, for example, may include a first encoder configured to encode the interaction topic 306, a second encoder configured to encode the preceding partial summary 308, and a decoder that attends hidden states of the preceding partial summary 308 as it attends the input encoder. This allows the decoder to generate an abstractive summary 310 that is more in continuation of the preceding partial summary 308 as it is aware of the previous context in which the abstractive summary 310 is being generated.

In this manner, the recursive abstractive model 302 may be configured to generate the abstractive summary 310 based on context from the interaction transcript 304 as a whole by considering the preceding partial summary 308 generated for the interaction transcript 304 in a previous iteration of the iterative divide and conquer technique. These recursive summarization techniques may be model agnostic and may be applied to any encoder decoder model to improve upon traditional divide and conquer summarization approaches that do not account for the context of a respective segment of an interaction transcript 304 and lack scalability for long form interaction dialogs.

In some embodiments, the divide and conquer techniques include receiving the preceding partial summary 308 for the interaction transcript 304. For example, a computing system, such as the computing system 100 may receive, obtain, generate, and/or the like the preceding partial summary 308 for the interaction transcript 304. The preceding partial summary 308 includes at least one preceding summary sentence corresponding to a preceding interaction topic that precedes the interaction topic 306 in the interaction transcript 304. By way of example, the one or more related sequential utterances of the interaction topic 306 may include a first subset of the plurality of interaction utterances of the interaction transcript 304 and the preceding partial summary 308 may include one or more preceding summary sentences corresponding to a second subset of the plurality of interaction utterances that precede (e.g., temporally, formally, structurally, and/or the like) the first subset in the interaction transcript 304.

In some embodiments, the preceding partial summary 308 includes a partial abstractive summary for the interaction transcript 304 that summarizes a portion of the plurality of interaction utterances of the interaction transcript 304. For example, the preceding partial summary 308 may include one or more preceding summary sentences corresponding to one or more preceding interaction topics that precede an interaction topic 306 being processed at a current iteration of a divide and conquer abstraction summarization technique. For instance, the interaction topic 306 may include a first subset of the plurality of interaction utterances of the interaction transcript 304. The preceding partial summary 308 may include one or more preceding summary sentences corresponding to a second subset of the plurality of interaction utterances that precede (e.g., temporally, formally, structurally, and/or the like) the first subset in the interaction transcript 304.

In some embodiments, the divide and conquer techniques include generating the abstractive summary 310 for the interaction transcript 304, using the recursive abstractive model 302, based on the interaction topic 306 and at least one preceding summary sentence from the preceding partial summary 308. For example, the computing system 100 may generate, using the recursive abstractive model 302, the abstractive summary 310 for the interaction transcript 304 based on the interaction topic 306 and at least one preceding summary sentence from the preceding partial summary 308. For instance, the interaction topic 306 and the preceding partial summary 308 may be provided as inputs to the recursive abstractive model 302. The recursive abstractive model 302 may be previously trained to generate the abstractive summary 310 based on the interaction topic 306 and the preceding partial summary 308 such that a summary for the interaction topic 306 may be generated based on contextual information from the preceding partial summary 308.

In this way, at each iteration of the iterative divide and conquer techniques of the present disclosure, a new partial abstractive summary may be generated based on a preceding partial summary and a new interaction topic of the interaction transcript 304. In some embodiments, a respective iteration is performed for each of the plurality of interaction topics of the interaction transcript 304 to iteratively generate a holistic abstractive summary that accounts for each interaction topic generated for the interaction transcript 304. In some examples, a respective iteration may be performed for each relevant interaction topic of the plurality of interaction topics of the interaction transcript 304.

An example of the recursive abstractive model 302 will now further be described with reference to FIG. 4.

Figure 4:
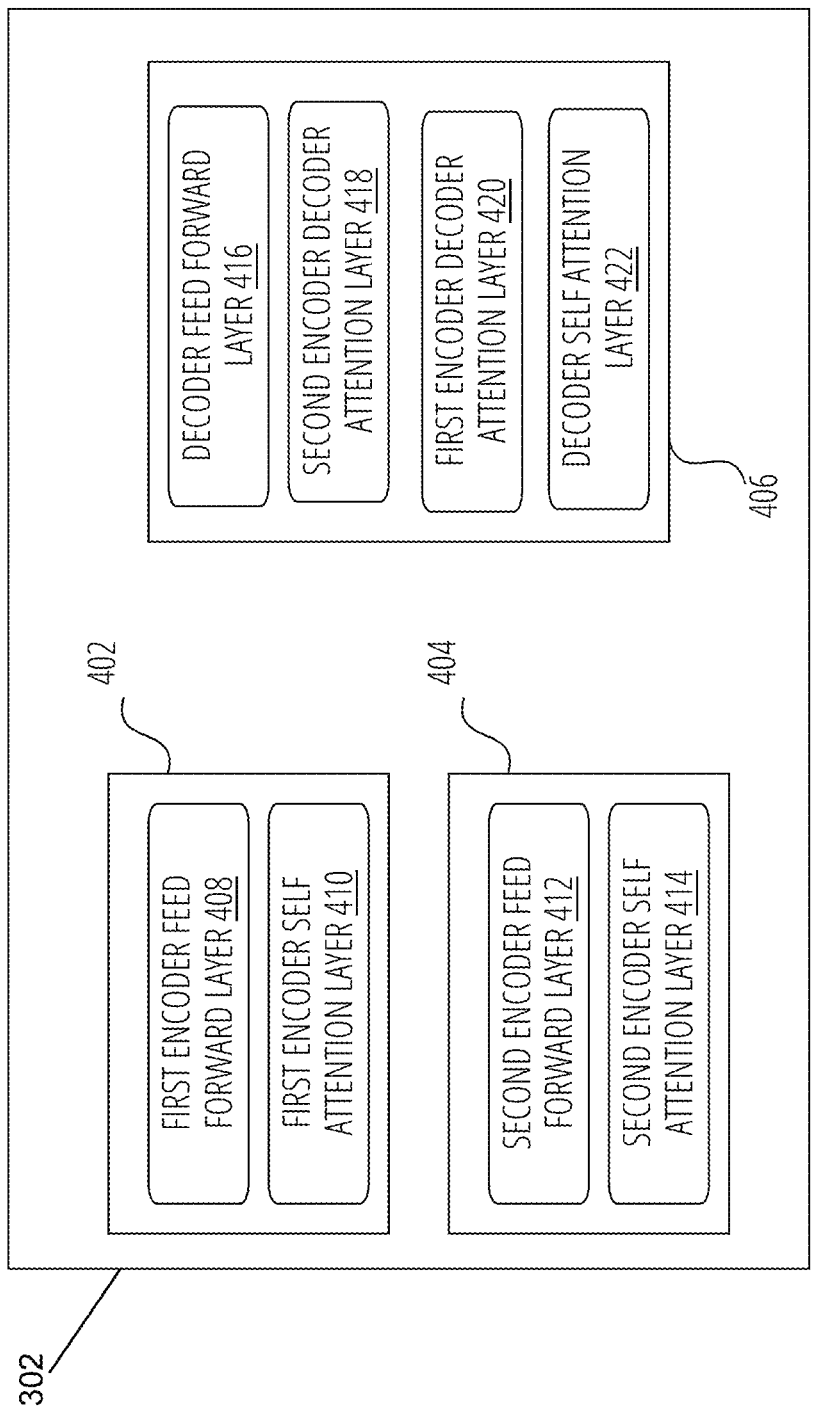
FIG. 4 is an operational example of a recursive abstractive model in accordance with some embodiments discussed herein.

FIG. 4 is an operational example of a recursive abstractive model 302 in accordance with some embodiments discussed herein. In some embodiments, the recursive abstractive model 302 includes a machine learning encoder decoder framework with at least a first encoder 402, a second encoder 404, and a joint decoder 406.

In some embodiments, the first encoder 402 includes a first encoder feed forward layer 408 and a first encoder self attention layer 410 configured to encode and attend features of an input interaction topic. In some embodiments, the first encoder 402 is configured to generate a first encoding based on the input interaction topic for a current iteration of an iterative divide and conquer technique.

In some embodiments, the second encoder 404 includes a second encoder feed forward layer 412 and a second encoder self attention layer 414 configured to encode and attend features of a preceding partial summary corresponding to an iteration preceding the current iteration of the iterative divide and conquer technique. In some embodiments, the second encoder 404 is configured to generate a second encoding based on at least one preceding summary sentence of the preceding partial summary.

In some embodiments, the joint decoder 406 includes a decoder feed forward layer 416, a second encoder decoder attention layer 418, a first encoder decoder attention layer 420, and/or a decoder self attention layer 422 configured to generate an abstractive summary based on the first and second encodings. In some embodiments, the recursive abstractive model 302 includes an attention layer configured to generate an attended encoding based on the first encoding and the second encoding. The attention layer, for example, may include the second encoder decoder attention layer 418 and the first encoder decoder attention layer 420 of the joint decoder 406. In some embodiments, the joint decoder 406 is configured to generate the abstractive summary for a current iteration of the iterative divide and conquer techniques based on the attended encoding.

In some embodiments, the recursive abstractive model 302 includes a data entity that describes parameters, hyperparameters, and/or defined operations of a machine learning model (e.g., model including at least one of one or more rule-based layers, one or more layers that depend on trained parameters, coefficients, and/or the like). A machine learning recursive abstractive model 302, for example, may include a divide and conquer model configured to generate an abstractive summary from an interaction transcript. The machine learning recursive abstractive model 302 may include one or more of any type of machine learning model including one or more supervised, unsupervised, semi-supervised, and/or reinforcement learning models. In some embodiments, the machine learning recursive abstractive model 302 may include multiple models configured to perform one or more different stages of an iterative abstractive summarization process.

In some embodiments, the machine learning recursive abstractive model 302 is a recursive summarization model that includes a neural network architecture. The machine learning recursive abstractive model 302 may include a double encoder network with a first encoder 402 (e.g., a first encoding layer), a second encoder 404 (e.g., second encoding layer), and attention layer and/or joint decoder 406 among other layers.

In some embodiments, the machine learning recursive abstractive model 302 generates the abstractive summary over one or more iterations of a divide and conquer technique. At each interaction, the machine learning recursive abstractive model 302 may generate a partial abstractive summary for an input interaction topic of the interaction transcript. Each partial abstractive summary, generated after the first iteration, may be generated based on a summary sentence (e.g., a preceding summary sentence) and/or a partial abstractive summary (e.g., a preceding partial summary) generated during one or more preceding iterations of the divide and conquer technique. For example, a preceding abstractive summary, generated during one or more iterations preceding a current iteration of the divide and conquer technique, may be passed to the machine learning recursive abstractive model 302 as a second input to be considered as contextual information for the input interaction topic.

In some embodiments, at a respective iteration, the first encoder 402 of the machine learning recursive abstractive model 302 is configured to generate a first encoding based on a respective interaction topic. In some embodiments, the second encoder 404 is configured to generate a second encoding based on a preceding partial summary (and/or one or more summary sentences thereof). For instance, the preceding partial summary may be passed to the machine learning recursive abstractive model 302 as input using the second encoder 404. The machine learning recursive abstractive model 302 may include an attention layer (e.g., second encoder decoder attention layer 418 and first encoder decoder attention layer 420) configured to generate an attended encoding based on the first encoding and the second encoding and a joint decoder 406 configured to generate the abstractive summary based on the attended encoding. For instance, the joint decoder 406 may attend the preceding partial summary hidden states as it attends the first encoding. In some embodiments, the recursive summarization techniques of the present disclosure are model agnostic and are applicable to any encoder-decoder, such as a DialogLM Model among others.

In some embodiments, the attended encoding includes an aggregation of two embeddings, a first and second embedding, generated from two transformer sources, the first encoder 402 and the second encoder 404, used for encoding the interaction utterances of an input interaction topic and at least one preceding summary sentence of a preceding partial summary, respectively. In some embodiments, the attended encoding is generated by combining the attention from these two transformer sources. The attention layer (e.g., second encoder decoder attention layer 418 and first encoder decoder attention layer 420), for example, may include a soft-lookup function operating on an associative memory. For each query Q, the attention layer computes a set of weighted sums of values I associated with a set of keys K, based on their similarity to the query. The variant of the attention function may be called a multi-head scaled dot-product attention.

In some embodiments, the machine learning recursive abstractive model 302 includes a plurality of layers. Each layer may be divided in three sub-layers: self-attention, encoder-decoder (or cross) attention, and a feed-forward layer. Both of the attention types use identical sets for keys and values. The states of the previous layer are used as the query sets. The self-attention sub-layer attends to the previous decoder layer (e.g., the sets of queries and keys are identical). The joint decoder 406 may work autoregressively from left to right during training such that the self-attention may be masked to prevent attending to the future positions in the sequence. The encoder-decoder attention sub-layers attend to the final layers of the encoders (e.g., first encoder 402 and second encoder 404). The feed-forward sub-layer consists of a single non-linear projection (usually to a space with larger dimension), followed by a linear projection back to the vector space with the original dimension. The input of each sub-layer is summed with the output, creating a residual connection chain throughout the whole layer stack.

In some embodiments, the machine learning recursive abstractive model 302 includes a serial combination of transformers, which model the encoder-decoder attention independently and extend the sub-layer scheme in the transformer decoder. In the serial strategy, the machine learning recursive abstractive model loss determines the encoder-decoder attention one-by-one for each input encoder. The query set of the first cross-attention is the set of the context vectors computed by the self-attention. The query set of each subsequent cross-attention is the output of the preceding sub-layer. All of these sub-layers may be interconnected with residual connections.

In some embodiments, by including a preceding partial summary when generating an abstractive summary for an interaction topic, the machine learning recursive abstractive model 302 generates more appropriate summaries considering the context provided by the preceding summaries. This enables the machine learning recursive abstractive model 302 to generate context aware abstractive summaries that improve upon the accuracy, readability, and scalability of summaries provided by traditional divide and conquer techniques.

Example training techniques for training the recursive abstractive model 302 will now further be described with reference to FIG. 5.

Figure 5:
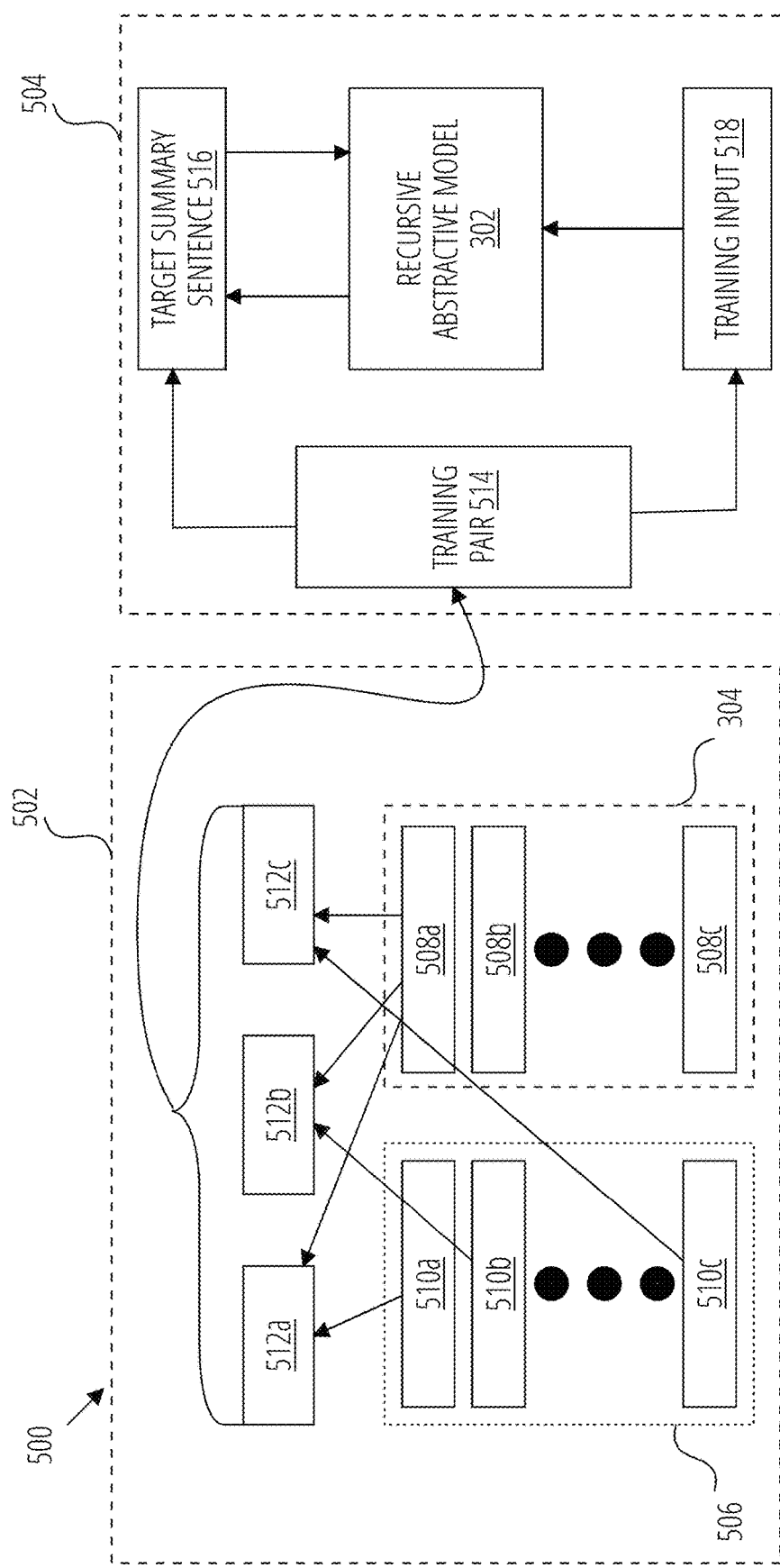
FIG. 5 is an operational example of a training technique for training a recursive abstractive model in accordance with some embodiments discussed herein.

FIG. 5 is an operational example of a training technique 500 for training a recursive abstractive model in accordance with some embodiments discussed herein. In some embodiments, the training technique 500 includes at least two phases. The first phase may include a data generation phase 502 during which new data generation techniques are leveraged to generate training data for training the recursive abstractive model 302. The second phase may include a training phase 504 during which new training techniques are leveraged to train the recursive abstractive model 302 using the training data.

In some embodiments, the training data includes a plurality of training pairs, each including a respective interaction topic from an interaction transcript 304 and a respective target summary sentence from a target summary 506. For example, a computing system, such as computing system 100, may generate a plurality of interaction topics 508a-c for the interaction transcript 304 using one or more topic segmentation techniques described herein. As described herein, each interaction topic 508a-c may include one or more related sequential utterances of the interaction transcript 304. The computing system 100 may generate a training pair 514 for a particular interaction topic 508a based on one or more holistic similarity scores 512a-c between the particular interaction topic 508a and each target summary sentence 510a-c of the target summary 506.

In some embodiments, a target summary 506 is a ground truth abstractive summary for the interaction transcript 304. The target summary 506 may be descriptive of a desired abstractive summary for the interaction transcript 304. The target summary 506 may include a plurality of target summary sentences 510a-c that are descriptive of one or more important aspects of the interaction transcript 304. The target summary 506 may be manually generated and/or automatically generated using one or more abstractive summarization techniques.

In some embodiments, the computing system 100 generates a plurality of holistic similarity scores 512a-c between the target summary 506 and the interaction transcript 304. Each of the holistic similarity scores 512a-c may be indicative of a similarity between a particular target summary sentence of the target summary 506 and a particular interaction topic of the interaction transcript 304. As some examples, a first holistic similarity score 512a may be indicative of a similarity between a first target summary sentence 510a and a first interaction topic 508a, a second holistic similarity score 512b may be indicative of a similarity between a second target summary sentence 510b and the first interaction topic 508a, and/or a third holistic similarity score 512c may be indicative of a similarity between a third target summary sentence 510c and the first interaction topic 508a. Additional holistic similarity scores may be generated between the target summary sentences 510a-c and a second interaction topic 508b and/or a third interaction topic 508c.

In some embodiments, the computing system 100 generates a training pair 514 for the recursive abstractive model 302 based on the plurality of holistic similarity scores 512a-c. In some embodiments, the training pair 514 includes an associated target summary sentence 516 and interaction topic. The training pair 514 may be based on a similarity threshold. For example, the training pair 514 may include a target summary sentence 516 and an interaction topic that achieve the similarity threshold. In some embodiments, the similarity threshold is indicative of a highest similarity value for the interaction topic. By way of example, the holistic similarity score may be a first holistic similarity score 512a between the particular interaction topic 508a and a first target summary sentence 510a of the target summary 506. The computing system 100 may generate a second holistic similarity score 512b between the particular interaction topic 508a and the second target summary sentence 510b of the target summary 506. In response to a determination that the first holistic similarity score 512a is higher than the second holistic similarity score 512b, the computing system 100 may generate the training pair 514. By way of example, the first target summary sentence 510a, $s_i$, may be associated with the first interaction topic 508a, Ok, to form the training pair 514 in the event that the first target summary sentence 510a, $s_i$, is associated with the highest holistic similarity score 512a relative to a plurality of holistic similarity scores 512a-c generated between interaction topic 508a, $\theta_j$, and each target summary sentence of the target summary 506 such that k=argmax$_{\{1 \leq j \leq M\}}$ Sim($s_i$, $\theta_j$).

During the training phase 504, the computing system 100 may identify the training pair 514 from the training data. The training pair may include at least a portion of a training input 518 and a corresponding ground truth for training the recursive abstractive model 302 using a loss function. The training input 518, for example, may include an interaction topic. The corresponding ground truth may include a target summary sentence 516 corresponding to the interaction topic.

In some embodiments, the training input 518 includes one or more preceding summary sentences of the target summary 506. For instance, the computing system 100 may identify at least one preceding summary sentence that precedes the target summary sentence 516 in the target summary 506. The recursive abstractive model 302 may be trained to output the target summary sentence 516 based on a training input 518 including the interaction topic and the at least one preceding summary sentence.

In some embodiments, the computing system 100 generates, using the recursive abstractive model 302, a training summary sentence for the interaction topic based on the one or more related sequential utterances of the interaction topic and the at least one preceding summary sentence. The computing system 100 may update the recursive abstractive model 302 based on a comparison between the training summary sentence and the target summary sentence 516. For example, one or more weights, parameters, and/or the like of the recursive abstractive model 302 may be continuously updated to align the training summary sentence with the target summary sentence 516. In some examples, the recursive abstractive model 302 may be updated by minimizing (and/or optimizing) a model loss for the recursive abstractive model 302. For example, the computing system 100 may update the one or more parameters of the recursive abstractive model 302 to minimize the model loss.

In some embodiments, the computing system 100 generates, using a loss function, the model loss for the recursive abstractive model 302. The model loss may be indicative of a training similarity between the training summary sentence and the target summary sentence 516.

In some embodiments, loss function is a machine learning training algorithm for evaluating and optimizing the performance of a machine learning model, such as the recursive abstractive model 302. The loss function may include any machine learning loss function including, as examples, binary cross-entropy loss, hinge loss, mean square error, mean absolute error, Huber loss, Log-Cosh loss, quantile loss, and/or the like. In some embodiments, the loss function is a log likelihood function configured to generate a model loss including a negative log likelihood loss. For instance, the recursive abstractive model 302 may be trained by updating one or more parameters of the recursive abstractive model 302 to minimize the model loss.

For example, during training, each respective topic segment of the interaction transcript 304 and a preceding summary sentence in the target summary 506 may be used as a training input 518 and an associated target summary sentence 516 corresponding to the respective interaction topic may be used as a ground truth. The recursive abstractive model 302 may be trained in a teacher forcing manner in which the model loss is minimized, for example, by minimizing a negative log likelihood target summary sequence, $S=(s_1, S_2, \ldots, SN)$, given the training input topic segments, $\theta_1, \theta_2, \ldots, \theta_1$ for the ith target summary sentence, $s_i$, with respect to the associated topic segment, $\theta_j$, and the preceding summary sentence in the target summary 506, $s_{i-1}$, in chronological order. In some embodiments, the target summary sentence 516, $s_i$, may be represented as a sequence of tokens, $s_i = w_1^i, w_2^i, \ldots, w_{l_i}^i$, where $l_i$ is the length of the target summary sentence 516, $s_i$, (e.g., the number of tokens appearing in it). In such case the loss function, which is to be minimized may include:

$$\text{loss}_t = -\sum_{\{i=1\}}^{N} \sum_{\{w_k^i \in s_i\}} p_{\{true\}}(w_k^i \mid w_k^i \in \text{scope}(s_{i-1}), \theta_j, w_{\{<k\}}^i, \Phi) \times$$

$$\log p_{\{summ\}}(w_k^i \mid \theta_j, s_{i-1}, w_{\{<k\}}^i, \Phi)$$

In some embodiments, $w_k^i \in \text{scope}(s_{i-1})$ if $w_k^i$ appears in a sentence following the sentence $s_{i-1}$ appearing in the target summary 506. In addition, or alternatively, $w_{\{<\}}^i$ may denote an output sequence of tokens of length less than k and @ is the set of estimation parameters of the transformer.

Example data generation techniques for generating the training pairs will now further be described with reference to FIG. 6.

Figure 6:
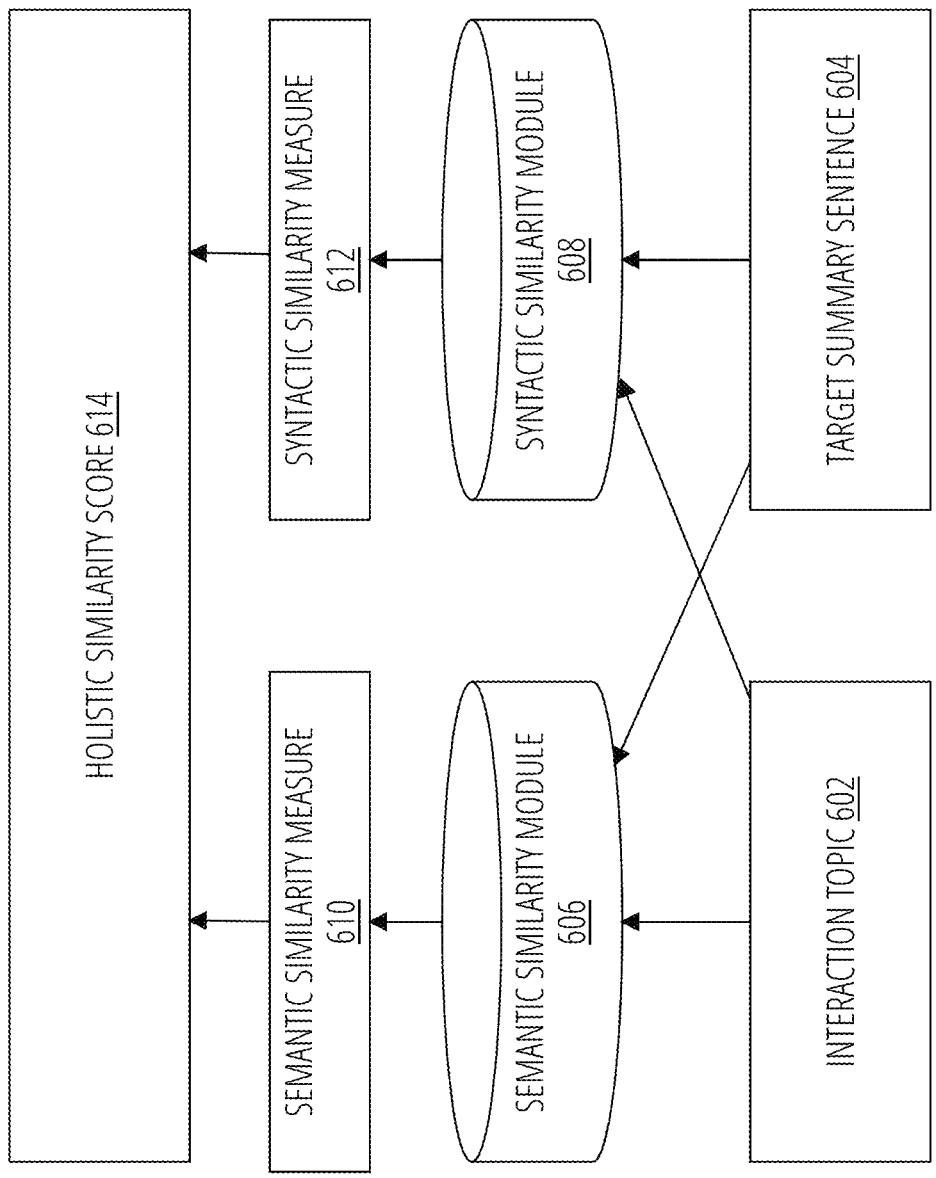
FIG. 6 is an operational example of a data generation technique for generating training data for a recursive abstractive model in accordance with some embodiments discussed herein.

FIG. 6 is an operational example of a data generation technique 600 for generating training data for a recursive abstractive model in accordance with some embodiments discussed herein. The data generation technique 600 combines multiple similarity measures generated by different similarity modules to generate a unique holistic similarity score 614 to account for various different features shared by an interaction topic 602 and a target summary sentence 604. For example, the data generation technique 600 may leverage a semantic similarity module 606 to generate a first measure of similarity (e.g., a semantic similarity measure 610) between an interaction topic 602 and a target summary sentence 604. In addition, the data generation technique 600 may leverage a syntactic similarity module 608 to generate a second, distinct measure of similarity (e.g., a syntactic similarity measure 612) between the interaction topic 602 and the target summary sentence 604. The first and second measures of similarity may be combined to generate a holistic similarity score 614 representative of holistic similarity between different features of the interaction topic 602 and the target summary sentence 604.

In some embodiments, the holistic similarity score 614 is a parameter that describes a similarity between the interaction topic 602 of an interaction transcript and the target summary sentence 604 of a target summary corresponding to the interaction transcript. The holistic similarity score 614 may be based on a semantic similarity measure 610 and/or a syntactic similarity measure 612 between the one or more related sequential utterances of the interaction topic 602 and the target summary sentence 604. For example, the holistic similarity score 614 may include a convex combination of the semantic similarity measure 610 and/or a syntactic similarity measure 612.

In some embodiments, the holistic similarity score 614 is based on a semantic similarity measure 610 between the one or more related sequential utterances of the interaction topic 602 and the target summary sentence 604. In some embodiments, the semantic similarity measure is a metric that describes a measure of similarity between one or more interaction utterances and the target summary sentence 604. The semantic similarity measure 610 may be generated using one or more different semantic similarity modules 606 including, as examples, one or more text transformers, and/or the like. The semantic similarity measure 610 between a target summary sentence 604, $s_i$, and one or more interaction utterances of an interaction topic 602, $\theta_j$, may be generated based on a cosine similarity between a respective embedded representation (e.g., using a test transformer, and/or the like) for the target summary sentence 604, $s_i$, and the interaction topic 602, $\theta_j$.

In some embodiments, the holistic similarity score 614 is based on a syntactic similarity measure 612 between the one or more related sequential utterances of the interaction topic 602 and the target summary sentence 604. In some embodiments, the syntactic similarity measure 612 is a metric that describes a measure of similarity between one or more interaction utterances and the target summary sentence 604. The syntactic similarity measure 612 may be generated using one or more different syntactic similarity modules 608 including, as examples, a Rouge score, and/or the like. A syntactic similarity measure 612 between a target summary sentence 604, $s_i$, and one or more interaction utterances of the interaction topic 602, $\theta_j$ may be generated based on a Rouge score between the target summary sentence 604, $s_i$, and the interaction topic 602, $\theta j$.

In some embodiments, the data generation technique 600 includes generating, using semantic similarity module 606 such as a text transformer, a semantic similarity measure 610 between the interaction topic 602 and the target summary sentence 604 based on a comparison between (i) a first embedded representation corresponding to the interaction topic 602 and (ii) a second embedded representation corresponding to the target summary sentence 604. In addition, the data generation technique 600 may include generating, using a syntactic similarity module 608, a syntactic similarity measure 612 based on a Rouge score between the one or more related sequential utterances of the interaction topic 602 and the target summary sentence 604. The data generation technique 600 may include generating the holistic similarity score 614 based on the semantic similarity measure 610 and the syntactic similarity measure 612. By way of example, the holistic similarity score 614 may include a convex combination of the semantic similarity measure 610 and the syntactic similarity measure 612.

Figure 7:
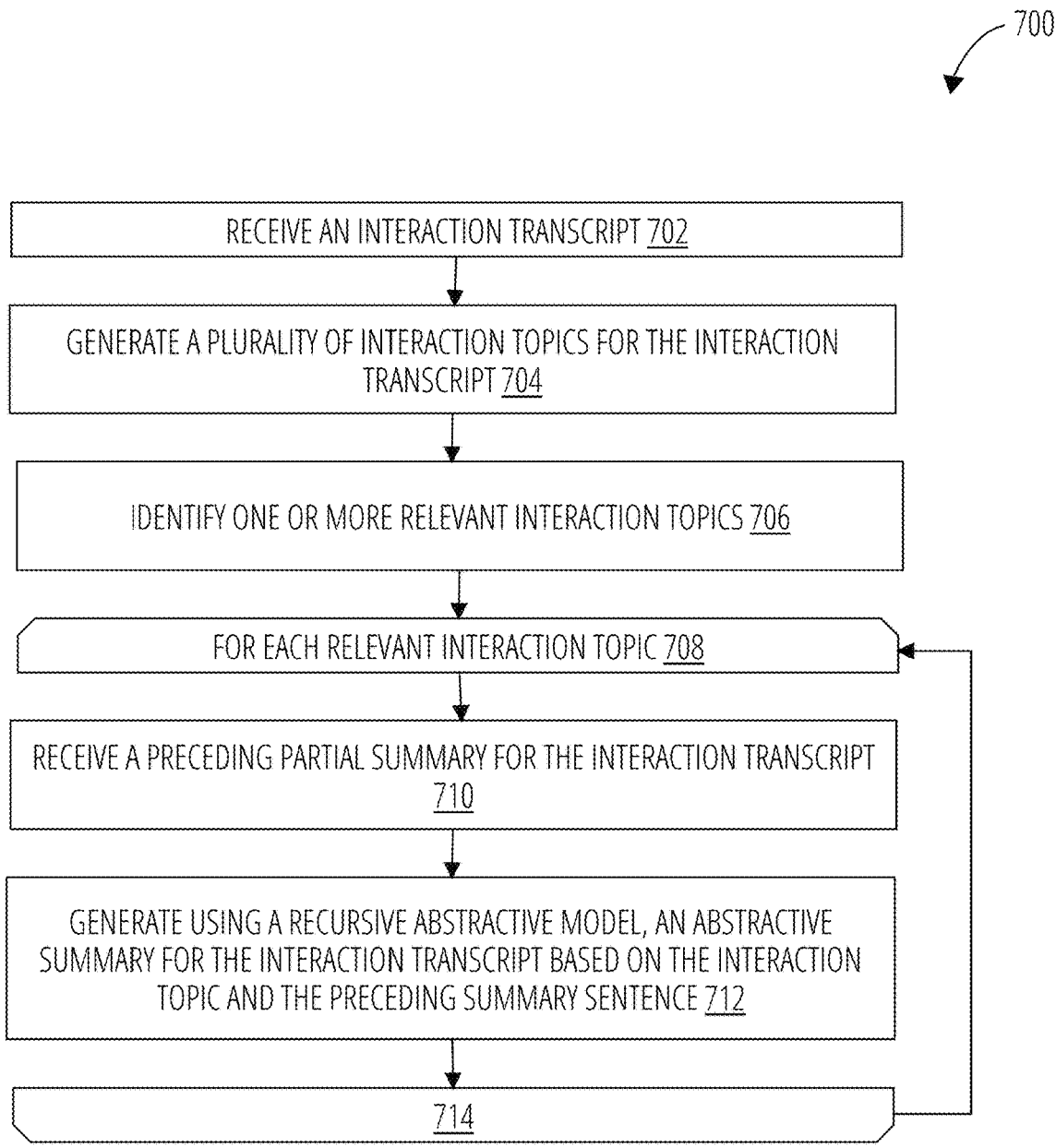
FIG. 7 is a flowchart showing an example of a process for generating an abstractive summary of an interaction transcript in accordance with some embodiments discussed herein.

FIG. 7 is a flowchart showing an example of a process 700 for generating an abstractive summary of an interaction transcript in accordance with some embodiments discussed herein. The flowchart depicts iterative divide and conquer techniques for summarizing a long form dialog that overcome various limitations such as a lack of scalability and accuracy of traditional divide and conquer approaches for summarizing complex documents. The iterative divide and conquer techniques may be implemented by one or more computing devices, entities, and/or systems described herein. For example, via the various steps/operations of the process 700, the computing system 100 may leverage a recursive abstractive model to overcome the various limitations with conventional summarization techniques that are (i) resource intensive and/or time consuming, (ii) lack scalability for long documents, and/or (iii) generate abstractive summaries with disparate summary sentences that lack context.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving an interaction transcript. For example, the computing system 100 may receive the interaction transcript. The interaction transcript may include a plurality of interaction utterances. In some embodiments, the interaction transcript is descriptive of a long, unstructured, dialog between one or more interaction participants.

In some embodiments, the process 700 includes, at step/operation 704, generating a plurality of interaction topics for the interaction transcript. For example, the computing system 100 may generate the plurality of interaction topics for the interaction transcript. In some embodiments, the interaction topic includes one or more related sequential utterances of the interaction transcript.

In some embodiments, the computing system generates, using a machine learning topic segmentation model, an utterance similarity score between a pair of interaction utterances from the plurality of interaction utterances. The computing system may assign a first topic label to a first interaction utterance of the pair of interaction utterances and a second topic label to a second interaction utterance of the pair of interaction utterances based on the utterance similarity score to generate at least two interaction topics.

In some embodiments, the process 700 includes, at step/operation 706, identifying one or more relevant interaction topics. For example, the computing system 100 may identify the one or more relevant interaction topics from the plurality of interaction topics generated for the interaction transcript. In some embodiments, the computing system determines a topic relevance for the interaction topic based on the one or more related sequential utterances of an interaction topic. A topic relevance may be indicative of at least one of a relevant topic or an irrelevant topic. In response to determining that the interaction topic is a relevant topic, the computing system 100 may proceed to step/operation 710 of the process 700.

In some embodiments, the computing system generates, using a machine learning extractive summarizer model, an extractive summary for the interaction transcript. The computing system 100 may generate a topic similarity score between the one or more related sequential utterances of the interaction topic and the extractive summary and determine the topic relevance of the interaction topic based on the topic similarity score. In some embodiments, the topic similarity score is indicative of a textual similarity between at least one of the one or more related sequential utterances and at least one extractive sentence from the extractive summary.

In some embodiments, the process 700 includes, at step/operation 710, receiving a preceding partial summary for the interaction transcript. For example, the computing system 100 may receive the preceding partial summary for the interaction transcript. In some embodiments, the preceding partial summary includes a preceding summary sentence corresponding to a preceding interaction topic that precedes the interaction topic in the interaction transcript. For example, the preceding partial summary may correspond to a previous iteration of the process 700.

In some embodiments, the process 700 includes, at step/operation 712, generating, using a recursive abstractive model, an abstractive summary for the interaction transcript based on the interaction topic and the preceding summary sentence. For example, the computing system 100 may generate, using the recursive abstractive model, the abstractive summary for the interaction transcript based on the interaction topic and the preceding summary sentence.

In some embodiments, the process 700 includes a plurality of iterations of a divide and conquer summarization technique. For example, at step/operation 714, the process 700 may return to step/operation 708 to perform another iteration of the divide and conquer summarization technique. At each iteration, a new interaction topic may be processed to iteratively revise and/or augment the abstractive summary. The new interaction topic at each iteration may be chronologically subsequent in the interaction transcript to the interaction topic of the preceding iteration. The preceding partial summary for each iteration may include the full partial summary for each interaction topic processed in previous iterations or one or more portions of the full partial summary. The plurality of iterations of the divide and conquer summarization technique may include an iteration for each relevant interaction topic identified for the interaction transcript.

Figure 8:
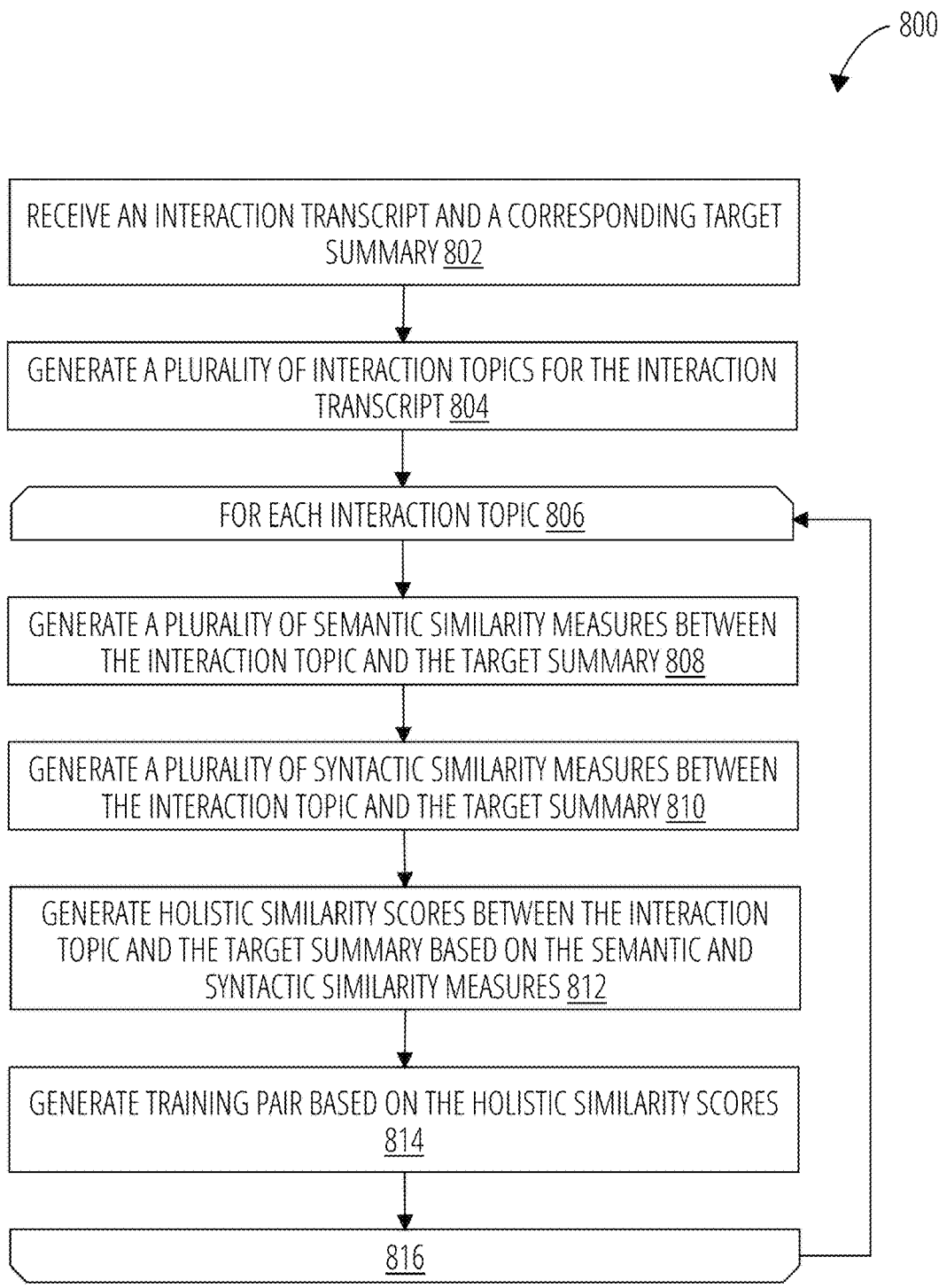
FIG. 8 is a flowchart showing an example of a process for generating training data for training a recursive abstractive model in accordance with some embodiments discussed herein.

FIG. 8 is a flowchart showing an example of a process 800 for generating training data for training a recursive abstractive model in accordance with some embodiments discussed herein. The flowchart depicts data generation techniques for automatically creating training data specifically tailored for training machine learning models configured for abstractive summarization. The data generation techniques may be implemented by one or more computing devices, entities, and/or systems described herein. For example, via the various steps/operations of the process 800, the computing system 100 may leverage the data generation techniques to facilitate the training of machine learning models that may be leveraged to overcome various limitations with conventional summarization techniques that are (i) resource intensive and/or time consuming, (ii) lack scalability for long documents, and/or (iii) generate abstractive summaries with disparate summary sentences that lack context.

FIG. 8 illustrates an example process 800 for explanatory purposes. Although the example process 800 depicts a particular sequence of steps/operations, the sequence may be altered without departing from the scope of the present disclosure. For example, some of the steps/operations depicted may be performed in parallel or in a different sequence that does not materially impact the function of the process 800. In other examples, different components of an example device or system that implements the process 800 may perform functions at substantially the same time or in a specific sequence.

In some embodiments, the process 800 includes, at step/operation 802, receiving an interaction transcript and a corresponding target summary. For example, the computing system 100 may receive the interaction transcript and the corresponding target summary.

In some embodiments, the process 800 includes, at step/operation 804, generating a plurality of interaction topics for the interaction transcript. For example, the computing system 100 may generate the plurality of interaction topics for the interaction transcript. In some embodiments, the interaction topic includes one or more related sequential utterances of the interaction transcript.

In some embodiments, the process 800 includes, at step/operation 804, generating a plurality of interaction topics for the interaction transcript. For example, the computing system 100 may generate the plurality of interaction topics for the interaction transcript. In some embodiments, the interaction topic includes one or more related sequential utterances of the interaction transcript.

In some embodiments, the process 800 includes, at step/operation 808, generating a plurality of semantic similarity measures between the interaction topic and the target summary. For example, the computing system 100 may generate the plurality of semantic similarity measures between the interaction topic and the target summary. In some embodiments, the computing system 100 generates, using a text transformer, a semantic similarity measure based on a comparison between (i) a first embedded representation corresponding to the interaction topic and (ii) a second embedded representation corresponding to a target summary sentence of the target summary.

In some embodiments, the process 800 includes, at step/operation 810, generating a plurality of syntactic similarity measures between the interaction topic and the target summary. For example, the computing system 100 may generate the plurality of syntactic similarity measures between the interaction topic and the target summary. In some embodiments, the computing system 100 generates the syntactic similarity measure based on a Rouge score between the one or more related sequential utterances of the interaction topic and a target summary sentence of the target summary.

In some embodiments, the process 800 includes, at step/operation 812, generating holistic similarity scores between the interaction topic and the target summary based on the semantic and syntactic similarity measures. For example, the computing system 100 may generate the holistic similarity scores between the interaction topic and the target summary based on the semantic and syntactic similarity measures. In some embodiments, the computing system generates a holistic similarity score based on the semantic similarity measure and the syntactic similarity measure. The holistic similarity score may include a convex combination of the semantic similarity measure and the syntactic similarity measure.

In some embodiments, the process 800 includes, at step/operation 814, generating a training pair based on the holistic similarity scores. For example, the computing system 100 may generate the training pair based on the holistic similarity scores. In some embodiments, the computing system may generate the training pair for the machine learning recursive abstractive model based on a highest holistic similarity score. For example, the computing system 100 may generate a first holistic similarity score between the particular interaction topic and a first summary sentence of the target summary and a second holistic similarity score between the particular interaction topic and a second summary sentence of the target summary. In response to a determination that the first holistic similarity score is higher than the second holistic similarity score, the computing system may generate the training pair with the particular interaction topic and a first summary sentence of the target summary.

According to some examples, the process 800 may include a plurality of iterations of a data generation technique. For example, at step/operation 816, the process 800 may return to step/operation 806 to perform another iteration of the data generation technique. At each iteration, a new training pair may be generated for a respective interaction topic of the interacting transcript. The plurality of iterations of the data generation technique may include an iteration for each interaction topic identified for the interaction transcript.

Figure 9:
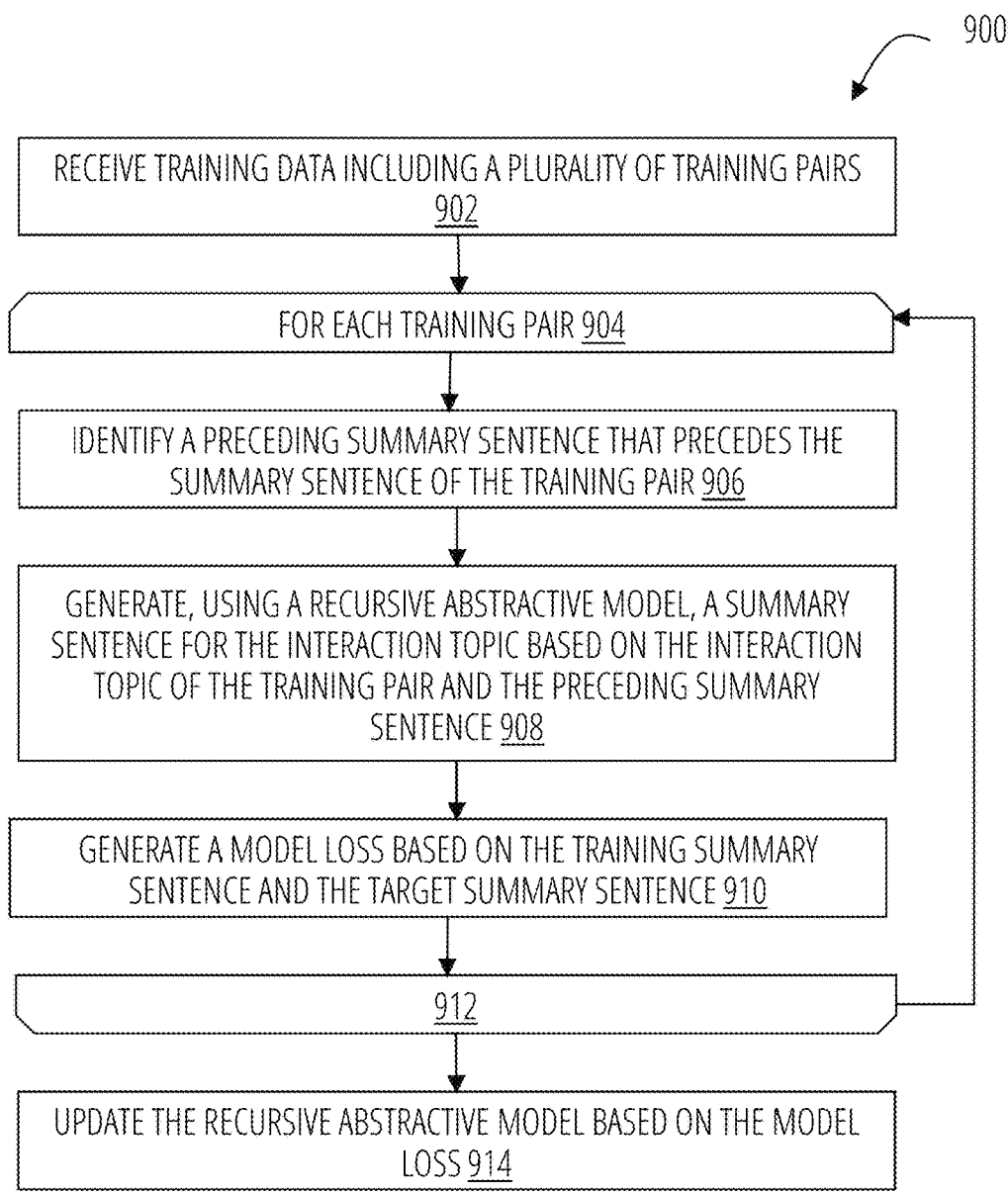
FIG. 9 is a flowchart showing an example of a process for training a recursive abstractive model in accordance with some embodiments discussed herein.

FIG. 9 is a flowchart showing an example of a process 900 for training a recursive abstractive model in accordance with some embodiments discussed herein. The flowchart depicts training techniques tailored to a new machine learning model trained to implement a divide and conquer summarization approach for a summarizing document without losing contextual insights offered by the document as a whole. The training techniques may be implemented by one or more computing devices, entities, and/or systems described herein. For example, via the various steps/operations of the process 900, the computing system 100 may leverage the training techniques to train a machine learning model using training data specifically tailored for the divide and conquer summarization techniques of the present disclosure. The trained model may be used to overcome the various limitations with conventional summarization techniques that are (i) resource intensive and/or time consuming, (ii) lack scalability for long documents, and/or (iii) generate abstractive summaries with disparate summary sentences that lack context.

FIG. 9 illustrates an example process 900 for explanatory purposes. Although the example process 900 depicts a particular sequence of steps/operations, the sequence may be altered without departing from the scope of the present disclosure. For example, some of the steps/operations depicted may be performed in parallel or in a different sequence that does not materially impact the function of the process 900. In other examples, different components of an example device or system that implements the process 900 may perform functions at substantially the same time or in a specific sequence.

In some embodiments, the process 900 includes, at step/operation 902, receiving training data including a plurality of training pairs. For example, the computing system 100 receives the training data including the plurality of training pairs. The training data may be previously generated using the data generation techniques of process 800.

In some embodiments, the process 900 includes, at step/operation 906, identifying a preceding summary sentence that precedes a target summary sentence of a training pair from the training data. For example, the computing system 100 may identify the preceding summary sentence that precedes the target summary sentence of the training pair.

In some embodiments, the process 900 includes, at step/operation 908, generating, using a recursive abstractive model, a training summary sentence for the interaction topic based on the interaction topic of the training pair and the preceding summary sentence. For example, the computing system 100 may generate, using a recursive abstractive model, the training summary sentence for the interaction topic based on the interaction topic of the training pair and the preceding summary sentence.

In some embodiments, the process 900 includes, at step/operation 910, generating a model loss based on the training summary sentence and the target summary sentence. For example, the computing system 100 may generate the model loss based on the training summary sentence and the target summary sentence. In some embodiments, the computing system generates, using a loss function, the model loss for the machine learning recursive abstractive model. The model loss may be indicative of a training similarity between the training summary sentence and the target summary sentence.

According to some examples, the process 900 may include a plurality of training iterations to iteratively update the model loss for the recursive abstractive model. For example, at step/operation 912, the process 900 may return to step/operation 904 to perform another training iteration. At each training iteration, a new training pair may be utilized to generate and/or augment a model loss for the recursive abstractive model. The plurality of training iterations may include an iteration for each training pair of the training data. In some embodiments, the training iteration may be based on a performance of the recursive abstractive model (e.g., as indicated by the model loss).

In some embodiments, the process 900 includes, at step/operation 914, updating the recursive abstractive model based on the model loss. For example, the computing system 100 may update the recursive abstractive model based on the model loss. In some embodiments, the computing system updates the machine learning recursive abstractive model based on a comparison between the training summary sentence and the target summary sentence. In some embodiments, the computing system updates one or more parameters of the machine learning recursive abstractive model to minimize the model loss. For example, the model loss may include a negative log likelihood loss.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. Examples

Example 1. A computer-implemented method comprising: generating, by one or more processors, a plurality of interaction topics for an interaction transcript, wherein each interaction topic comprises one or more respective related sequential utterances of the interaction transcript; receiving, by the one or more processors, a preceding partial summary for the interaction transcript, wherein the preceding partial summary corresponds to at least one preceding interaction topic that precedes an interaction topic in the interaction transcript; and generating, by the one or more processors and using a machine learning recursive abstractive model, an abstractive summary for the interaction transcript based on the interaction topic and the preceding partial summary.

Example 2. The computer-implemented method of example 1, wherein the interaction transcript comprises a plurality of interaction utterances, one or more related sequential utterances of the interaction topic comprise a first subset of the plurality of interaction utterances, and the preceding partial summary comprises one or more preceding summary sentences corresponding to a second subset of the plurality of interaction utterances that precede the first subset in the interaction transcript.

Example 3. The computer-implemented method of example 2, wherein generating the plurality of interaction topics for the interaction transcript comprises: generating, by the one or more processors and using a machine learning topic segmentation model, an utterance similarity score between a pair of interaction utterances from the plurality of interaction utterances; assigning, by the one or more processors, a first topic label to a first interaction utterance of the pair of interaction utterances based on the utterance similarity score; and assigning, by the one or more processors, a second topic label to a second interaction utterance of the pair of interaction utterances based on the utterance similarity score.

Example 4. The computer-implemented method of any of the preceding examples further comprising: determining, by the one or more processors, a topic relevance for the interaction topic based on one or more related sequential utterances of the interaction topic, wherein the topic relevance is indicative of at least one of a relevant topic or an irrelevant topic; and in response to determining that the interaction topic is the relevant topic, generating, by the one or more processors and using the machine learning recursive abstractive model, the abstractive summary for the interaction transcript based on the interaction topic.

Example 5. The computer-implemented method of example 4, wherein determining the topic relevance comprises: generating, by the one or more processors and using a machine learning extractive summarizer model, an extractive summary for the interaction transcript; generating, by the one or more processors, a topic similarity score between the one or more related sequential utterances and the extractive summary; and determining, by the one or more processors, the topic relevance of the interaction topic based on the topic similarity score.

Example 6. The computer-implemented method of example 5, wherein the topic similarity score is indicative of a textual similarity between at least one of the one or more related sequential utterances and at least one extractive sentence from the extractive summary.

Example 7. The computer-implemented method of any of the preceding examples, wherein: the machine learning recursive abstractive model comprises a first encoder and a second encoder, the first encoder is configured to generate a first encoding based on the interaction topic, and the second encoder is configured to generate a second encoding based on the preceding partial summary.

Example 8. The computer-implemented method of example 7, wherein the machine learning recursive abstractive model further comprises an attention layer configured to generate an attended encoding based on the first encoding and the second encoding.

Example 9. The computer-implemented method of example 8, wherein the machine learning recursive abstractive model further comprises a decoder configured to generate the abstractive summary based on the attended encoding.

Example 10. The computer-implemented method of example 9, wherein the machine learning recursive abstractive model comprises a neural network architecture.

Example 11. A computing apparatus comprising memory and one or more processors communicatively coupled to the memory, the one or more processors configured to: generate a plurality of interaction topics for an interaction transcript, wherein each interaction topic comprises one or more respective related sequential utterances of the interaction transcript; receive a preceding partial summary for the interaction transcript, wherein the preceding partial summary corresponds to at least one preceding interaction topic that precedes an interaction topic in the interaction transcript; and generate, using a machine learning recursive abstractive model, an abstractive summary for the interaction transcript based on the interaction topic and the preceding partial summary.

Example 12. The computing apparatus of example 11, wherein: the interaction transcript comprises a plurality of interaction utterances, one or more related sequential utterances of the interaction topic comprise a first subset of the plurality of interaction utterances, and the preceding partial summary comprises one or more preceding summary sentences corresponding to a second subset of the plurality of interaction utterances that precede the first subset.

Example 13. The computing apparatus of example 12, wherein generating the plurality of interaction topics for the interaction transcript comprises: generating, using a machine learning topic segmentation model, an utterance similarity score between a pair of interaction utterances from the plurality of interaction utterances; assigning a first topic label to a first interaction utterance of the pair of interaction utterances based on the utterance similarity score; and assigning a second topic label to a second interaction utterance of the pair of interaction utterances based on the utterance similarity score.

Example 14. The computing apparatus of any of examples 11 through 13, wherein the one or more processors are further configured to: determine a topic relevance for the interaction topic based on one or more related sequential utterances of the interaction topic, wherein the topic relevance is indicative of at least one of a relevant topic or an irrelevant topic; and in response to determining that the interaction topic is the relevant topic, generate, using the machine learning recursive abstractive model, the abstractive summary for the interaction transcript based on the interaction topic.

Example 15. The computing apparatus of example 14, wherein determining the topic relevance comprises: generating, using a machine learning extractive summarizer model, an extractive summary for the interaction transcript; generating a topic similarity score between the one or more related sequential utterances and the extractive summary; and determining the topic relevance of the interaction topic based on the topic similarity score.

Example 16. The computing apparatus of example 15, wherein the topic similarity score is indicative of a textual similarity between at least one of the one or more related sequential utterances and at least one extractive sentence from the extractive summary.

Example 17. One or more non-transitory computer-readable storage media including instructions that, when executed by one or more processors, cause the one or more processors to: generate a plurality of interaction topics for an interaction transcript, wherein each interaction topic comprises one or more respective related sequential utterances of the interaction transcript; receive a preceding partial summary for the interaction transcript, wherein the preceding partial summary corresponds to at least one preceding interaction topic that precedes an interaction topic in the interaction transcript; and generate, using a machine learning recursive abstractive model, an abstractive summary for the interaction transcript based on the interaction topic and the preceding partial summary.

Example 18. The one or more non-transitory computer-readable storage media of example 17, wherein: the machine learning recursive abstractive model comprises a first encoder and a second encoder, the first encoder is configured to generate a first encoding based on the interaction topic, and the second encoder is configured to generate a second encoding based on the preceding partial summary.

Example 19. The one or more non-transitory computer-readable storage media of example 18, wherein the machine learning recursive abstractive model further comprises an attention layer configured to generate an attended encoding based on the first encoding and the second encoding.

Example 20. The one or more non-transitory computer-readable storage media of example 19, wherein the machine learning recursive abstractive model further comprises a decoder configured to generate the abstractive summary based on the attended encoding.

Example 21. A computer-implemented method comprising: generating, by one or more processors, a plurality of interaction topics for an interaction transcript, wherein each interaction topic comprises one or more respective related sequential utterances of the interaction transcript; generating, by the one or more processors, a holistic similarity score between a particular interaction topic and a target summary sentence of a target summary corresponding to the interaction transcript; identifying, by the one or more processors, a preceding summary sentence that precedes the target summary sentence in the target summary; generating, by the one or more processors and using a machine learning recursive abstractive model, a training summary sentence for the particular interaction topic based on one or more related sequential utterances of the particular interaction topic and the preceding summary sentence; and updating, by the one or more processors, the machine learning recursive abstractive model based on a comparison between the training summary sentence and the target summary sentence.

Example 22. The computer-implemented method of example 21, wherein the holistic similarity score is based on a semantic similarity measure between the one or more related sequential utterances and the target summary sentence.

Example 23. The computer-implemented method of example 22, wherein the holistic similarity score is based on a syntactic similarity measure between the one or more related sequential utterances and the target summary sentence.

Example 24. The computer-implemented method of example 23, wherein generating the holistic similarity score comprises: generating, by the one or more processors and using a text transformer, the semantic similarity measure based on a comparison between (i) a first embedded representation corresponding to the particular interaction topic and (ii) a second embedded representation corresponding to the target summary sentence; generating, by the one or more processors, the syntactic similarity measure based on a Rouge score between the one or more related sequential utterances and the target summary sentence; and generating, by the one or more processors, the holistic similarity score based on the semantic similarity measure and the syntactic similarity measure.

Example 25. The computer-implemented method of any of examples 23 through 24, wherein the holistic similarity score comprises a convex combination of the semantic similarity measure and the syntactic similarity measure.

Example 26. The computer-implemented method of any of the preceding examples further comprising: generating, by the one or more processors, a training pair for the machine learning recursive abstractive model based on the holistic similarity score.

Example 27. The computer-implemented method of example 26, wherein the holistic similarity score is a first holistic similarity score, and wherein generating the training pair comprises: generating, by the one or more processors, a second holistic similarity score between the particular interaction topic and another summary sentence of the target summary; and generating, by the one or more processors, the training pair in response to a determination that the first holistic similarity score is higher than the second holistic similarity score.

Example 28. The computer-implemented method of examples 26 or 27, wherein the training pair is based on a similarity threshold.

Example 29. The computer-implemented method of any of the preceding examples, wherein updating the machine learning recursive abstractive model comprises: generating, by the one or more processors and using a loss function, a model loss for the machine learning recursive abstractive model, wherein the model loss is indicative of a training similarity between the training summary sentence and the target summary sentence; and updating, by the one or more processors, one or more parameters of the machine learning recursive abstractive model to minimize the model loss.

Example 30. The computer-implemented method of example 29, wherein the model loss comprises a negative log likelihood loss.

Example 31. A computing apparatus comprising memory and one or more processors communicatively coupled to the memory, the one or more processors configured to: generate a plurality of interaction topics for an interaction transcript, wherein each interaction topic comprises one or more respective related sequential utterances of the interaction transcript; generate a holistic similarity score between a particular interaction topic and a target summary sentence of a target summary corresponding to the interaction transcript; identify a preceding summary sentence that precedes the target summary sentence in the target summary; generate, using a machine learning recursive abstractive model, a training summary sentence for the particular interaction topic based on one or more related sequential utterances of the particular interaction topic and the preceding summary sentence; and update the machine learning recursive abstractive model based on a comparison between the training summary sentence and the target summary sentence.

Example 32. The computing apparatus of example 31, wherein the holistic similarity score is based on a semantic similarity measure between the one or more related sequential utterances and the target summary sentence.

Example 33. The computing apparatus of example 32, wherein the holistic similarity score is based on a syntactic similarity measure between the one or more related sequential utterances and the target summary sentence.

Example 34. The computing apparatus of example 33, wherein generating the holistic similarity score comprises: generating, using a text transformer, the semantic similarity measure based on a comparison between (i) a first embedded representation corresponding to the particular interaction topic and (ii) a second embedded representation corresponding to the target summary sentence; generating the syntactic similarity measure based on a Rouge score between the one or more related sequential utterances and the target summary sentence; and generating the holistic similarity score based on the semantic similarity measure and the syntactic similarity measure.

Example 35. The computing apparatus of examples 33 or 34, wherein the holistic similarity score comprises a convex combination of the semantic similarity measure and the syntactic similarity measure.

Example 36. The computing apparatus of example 31, wherein the one or more processors are further configured to: generate a training pair for the machine learning recursive abstractive model based on the holistic similarity score.

Example 37. The computing apparatus of example 36, wherein the holistic similarity score is a first holistic similarity score, and wherein generating the training pair comprises: generating a second holistic similarity score between the particular interaction topic and another summary sentence of the target summary; and generating the training pair in response to a determination that the first holistic similarity score is higher than the second holistic similarity score.

Example 38. The computing apparatus of examples 36 or 37, wherein the training pair is based on a similarity threshold.

Example 39. One or more non-transitory computer-readable storage media including instructions that, when executed by one or more processors, cause the one or more processors to: generate a plurality of interaction topics for an interaction transcript, wherein each interaction topic comprises one or more related sequential utterances of the interaction transcript; generate a holistic similarity score between a particular interaction topic and a target summary sentence of a target summary corresponding to the interaction transcript; identify a preceding summary sentence that precedes the target summary sentence in the target summary; generate, using a machine learning recursive abstractive model, a training summary sentence for the particular interaction topic based on one or more related sequential utterances of the particular interaction topic and the preceding summary sentence; and update the machine learning recursive abstractive model based on a comparison between the training summary sentence and the target summary sentence.

Example 40. The one or more non-transitory computer-readable storage media of example 39, wherein updating the machine learning recursive abstractive model comprises: generating, using a loss function, a model loss for the machine learning recursive abstractive model, wherein the model loss is indicative of a training similarity between the training summary sentence and the target summary sen-

The invention claimed is:

1. A computer-implemented method comprising:
generating, by one or more processors, a plurality of interaction topics for an interaction transcript, wherein each interaction topic comprises one or more respective related sequential utterances of the interaction transcript;
generating, by the one or more processors, a holistic similarity score between a particular interaction topic and a target summary sentence of a target summary corresponding to the interaction transcript;
identifying, by the one or more processors, a preceding summary sentence that precedes the target summary sentence in the target summary;
generating, by the one or more processors and using a machine learning recursive abstractive model, a training summary sentence for the particular interaction topic based on one or more related sequential utterances of the particular interaction topic and the preceding summary sentence; and
updating, by the one or more processors, the machine learning recursive abstractive model based on a comparison between the training summary sentence and the target summary sentence.

2. The computer-implemented method of claim 1, wherein the holistic similarity score is based on a semantic similarity measure between the one or more related sequential utterances and the target summary sentence.

3. The computer-implemented method of claim 2, wherein the holistic similarity score is based on a syntactic similarity measure between the one or more related sequential utterances and the target summary sentence.

4. The computer-implemented method of claim 3, wherein generating the holistic similarity score comprises:
generating, by the one or more processors and using a text transformer, the semantic similarity measure based on a comparison between (i) a first embedded representation corresponding to the particular interaction topic and (ii) a second embedded representation corresponding to the target summary sentence;
generating, by the one or more processors, the syntactic similarity measure based on a Rouge score between the one or more related sequential utterances and the target summary sentence; and
generating, by the one or more processors, the holistic similarity score based on the semantic similarity measure and the syntactic similarity measure.

5. The computer-implemented method of claim 3, wherein the holistic similarity score comprises a convex combination of the semantic similarity measure and the syntactic similarity measure.

6. The computer-implemented method of claim 1 further comprising:
generating, by the one or more processors, a training pair for the machine learning recursive abstractive model based on the holistic similarity score.

7. The computer-implemented method of claim 6, wherein the holistic similarity score is a first holistic similarity score, and wherein generating the training pair comprises:
generating, by the one or more processors, a second holistic similarity score between the particular interaction topic and another summary sentence of the target summary; and
generating, by the one or more processors, the training pair in response to a determination that the first holistic similarity score is higher than the second holistic similarity score.

8. The computer-implemented method of claim 6, wherein the training pair is based on a similarity threshold.

9. The computer-implemented method of claim 1, wherein updating the machine learning recursive abstractive model comprises:
generating, by the one or more processors and using a loss function, a model loss for the machine learning recursive abstractive model, wherein the model loss is indicative of a training similarity between the training summary sentence and the target summary sentence; and
updating, by the one or more processors, one or more parameters of the machine learning recursive abstractive model to minimize the model loss.

10. The computer-implemented method of claim 9, wherein the model loss comprises a negative log likelihood loss.

11. A computing apparatus comprising memory and one or more processors communicatively coupled to the memory, the one or more processors configured to:
generate a plurality of interaction topics for an interaction transcript, wherein each interaction topic comprises one or more respective related sequential utterances of the interaction transcript;
generate a holistic similarity score between a particular interaction topic and a target summary sentence of a target summary corresponding to the interaction transcript;
identify a preceding summary sentence that precedes the target summary sentence in the target summary;
generate, using a machine learning recursive abstractive model, a training summary sentence for the particular interaction topic based on one or more related sequential utterances of the particular interaction topic and the preceding summary sentence; and
update the machine learning recursive abstractive model based on a comparison between the training summary sentence and the target summary sentence.

12. The computing apparatus of claim 11, wherein the holistic similarity score is based on a semantic similarity measure between the one or more related sequential utterances and the target summary sentence.

13. The computing apparatus of claim 12, wherein the holistic similarity score is based on a syntactic similarity measure between the one or more related sequential utterances and the target summary sentence.

14. The computing apparatus of claim 13, wherein generating the holistic similarity score comprises:
generating, using a text transformer, the semantic similarity measure based on a comparison between (i) a first embedded representation corresponding to the particular interaction topic and (ii) a second embedded representation corresponding to the target summary sentence;
generating the syntactic similarity measure based on a Rouge score between the one or more related sequential utterances and the target summary sentence; and
generating the holistic similarity score based on the semantic similarity measure and the syntactic similarity measure.

15. The computing apparatus of claim 13, wherein the holistic similarity score comprises a convex combination of the semantic similarity measure and the syntactic similarity measure.

16. The computing apparatus of claim 11, wherein the one or more processors are further configured to:
generate a training pair for the machine learning recursive abstractive model based on the holistic similarity score.

17. The computing apparatus of claim 16, wherein the holistic similarity score is a first holistic similarity score, and wherein generating the training pair comprises:
generating a second holistic similarity score between the particular interaction topic and another summary sentence of the target summary; and
generating the training pair in response to a determination that the first holistic similarity score is higher than the second holistic similarity score.

18. The computing apparatus of claim 16, wherein the training pair is based on a similarity threshold.

19. One or more non-transitory computer-readable storage media including instructions that, when executed by one or more processors, cause the one or more processors to:
generate a plurality of interaction topics for an interaction transcript, wherein each interaction topic comprises one or more related sequential utterances of the interaction transcript;
generate a holistic similarity score between a particular interaction topic and a target summary sentence of a target summary corresponding to the interaction transcript;
identify a preceding summary sentence that precedes the target summary sentence in the target summary;
generate, using a machine learning recursive abstractive model, a training summary sentence for the particular interaction topic based on one or more related sequential utterances of the particular interaction topic and the preceding summary sentence; and
update the machine learning recursive abstractive model based on a comparison between the training summary sentence and the target summary sentence.

20. The one or more non-transitory computer-readable storage media of claim 19, wherein updating the machine learning recursive abstractive model comprises:
generating, using a loss function, a model loss for the machine learning recursive abstractive model, wherein the model loss is indicative of a training similarity between the training summary sentence and the target summary sentence; and
updating one or more parameters of the machine learning recursive abstractive model to minimize the model loss.

* * * * *